(12) United States Patent
Sanders

(10) Patent No.: US 7,182,818 B2
(45) Date of Patent: Feb. 27, 2007

(54) SYSTEM TO PRODUCE SUGAR FROM PLANT MATERIALS

(75) Inventor: David O. Sanders, Loveland, CO (US)

(73) Assignee: Nalco Company, Naperville, IL (US)

( * ) Notice: Subject to any disclaimer, the term of this patent is extended or adjusted under 35 U.S.C. 154(b) by 218 days.

(21) Appl. No.: 10/511,516

(22) PCT Filed: Jan. 6, 2003

(86) PCT No.: PCT/US03/00331

§ 371 (c)(1),
(2), (4) Date: Oct. 15, 2004

(87) PCT Pub. No.: WO03/089673

PCT Pub. Date: Oct. 30, 2003

(65) Prior Publication Data

US 2005/0175750 A1    Aug. 11, 2005

Related U.S. Application Data

(63) Continuation of application No. 10/123,120, filed on Apr. 15, 2002, now Pat. No. 6,656,287.

(60) Provisional application No. 60/403,549, filed on Aug. 13, 2002.

(51) Int. Cl.
*C13D 3/12* (2006.01)
*C13D 3/02* (2006.01)

(52) U.S. Cl. .................. 127/52; 127/48; 127/50; 127/53

(58) Field of Classification Search ............. 127/48, 127/50, 52, 53
See application file for complete search history.

(56) References Cited

U.S. PATENT DOCUMENTS

| H1206 H | 7/1993 | Thibodeaux |
| 5,480,490 A | 1/1996 | Toth et al. |
| 6,656,287 B2 * | 12/2003 | Sanders .................. 127/53 |

* cited by examiner

*Primary Examiner*—David M. Brunsman
(74) *Attorney, Agent, or Firm*—William J. Maheras; Thomas M. Breininger

(57) ABSTRACT

A process system that uses a reduced amount of lime or other base to clarify or purify juice or other process liquid (1) obtained from plant material (2) such as sugar cane, sugar beets, or sweet sorghum. Specifically, apparatus and methods to reduce volatile materials in juice or other process liquid (1) to increase pH requiring the use of less lime or other base to achieve the desired pH values for clarification or purification in subsequent steps, such as preliming (33).

7 Claims, 11 Drawing Sheets

SYSTEM TO PRODUCE SUGAR FROM PLANT MATERIALS

This application is the U.S. National Stage of International Patent Cooperation Treaty Patent Application No. PCT/US03/00331, filed Jan. 6, 2003, which is a continuation of U.S. patent application Ser. No. 10/123,120 filed Apr. 15, 2002 now issued as U.S. Pat. No. 6,656,287 on Dec. 2, 2003, and claims the benefit of U.S. Provisional Patent Application No. 60/403,594, filed Aug. 13, 2002, each hereby incorporated by reference.

I. TECHNICAL FIELD

A process system for the production of sugar from process liquids obtained from plant material which includes the mass transfer of volatile components from process liquids to the gas phase.

II. BACKGROUND

Sucrose, $C_{12}H_{22}O_{11}$, a disaccharide, is a condensation molecule that links one glucose monosaccharide and one fructose monosaccharide. Sucrose occurs naturally in many fruits and vegetables of the plant kingdom, such as sugarcane, sugar beets, sweet sorghum, sugar palms, or sugar maples. The amount of sucrose produced by plants can be dependent on the genetic strain, soil or fertilization factors, weather conditions during growth, incidence of plant disease, degree of maturity or the treatment between harvesting and processing, among many factors.

Sucrose may be concentrated in certain portions of the plant. For example, sucrose is concentrated in the stalks of the sugarcane plant and in the root of the sugar beet. The entire plant, or the portion of the plant in which the sucrose is concentrated, may be harvested and the plant juices may be removed or extracted to obtain a process liquid containing a certain concentration of sucrose. Typically, the removal or extraction of juices from plant material involves milling, diffusion, pressing, individually or in combination.

Milling is one of the conventional methods for extracting juice from sugar cane stalks. The sugar cane stalks may be cut up into pieces having the desired size and then passed through rollers to squeeze out the juices. This process may be repeated several times down a series of mills to ensure that substantially all the sugar cane juice is removed.

Diffusion is considered to be the conventional method for extracting juice from the root of the sugar beet. Sugar beets may be sliced into thin strips called "cossettes" that can be introduced into one end of a diffuser while a diffusion liquid, such as warm water, enters the other end of the diffuser. When such counter current processing is used about 98 percent of the sucrose from the cossette or sugar beet material can be removed. The resulting sucrose containing process liquid is often called "diffusion juice." The cossettes or beet slices from the diffuser can still be very wet and the juice, which can be 88–92% water, associated with them can still hold some sucrose. The cossettes or beet slices may, therefore, be pressed in a screw press, or other type of press, to squeeze as much juice out of them as possible. This process liquid often referred to as "pulp press water" can have a pH value of about 5 and in some cases is returned to the diffuser. The resulting pulp may contain about 75% moisture. The addition to the press feed of cationic charged pressing aids can be used to lower the pulp moisture content by about 1.5 to 2%. Sucrose from sugarcane stalks can also be removed by diffusion. One diffusion process for sugarcane involves a moving bed of finely prepared sugarcane pieces passed through the diffuser allowing the sucrose to be leached out of the sugarcane.

The diffusion process, the milling process, other processes that remove juice from plant material result in a process liquid containing sucrose, non-sucrose substances, and water. The nature and amount of the non-sucrose substances in the juice obtained by these processes can vary and may include all manner of plant derived substances and non-plant derived substances, including but not limited to: insoluble material, such as, plant fiber or soil particles; and soluble materials, such as, fertilizer, sucrose, saccharides other than sucrose, organic and inorganic non-sugars, organic acids, dissolved gases, proteins, inorganic acids, organic acids, phosphates, metal ions (for example, iron, aluminum, or magnesium ions), pectins, colored materials, saponins, waxes, fats, or gums, their associated or linked moieties, or derivatives thereof.

These non-sucrose substances are often highly colorized, thermally unstable, or otherwise interfere with certain processing steps or adversely impact the quality or quantity of the sugar product resulting from the purification process. It has been estimated that on average one pound of non-sucrose substances reduces the quantity of sugar product resulting from the purification process by one and one-half pounds. It may be desirable to have all or a portion of these non-sucrose substances separated from or removed from the process liquid resulting from the diffusion, milling, or other methods used to remove juice from the plant material. A good diffusion operation can eliminate 25–30% of entering impurities. Returned pulp or carbonation press water can reduce this level to 17–20%, and can be economical due to heat recovery, make up water saved, wastewater pollution reduced, or additional sugar recovered.

Process systems, including the embodiments of the invention described herein, or those described by U.S. Pat. Nos. 6,051,075; 5,928,42; 5,480,490, each hereby incorporated by reference, or those described by "Sugar Technology, Beet and Cane Sugar Manufacture" by P. W. van der Poel et al. (1998); "Beet-Sugar Technology" edited by R. A. McGinnis, Third Edition (1982); or Cane Sugar Handbook: A Manual for Cane Sugar Manufacturers and Their Chemists by James C. P. Chen, Chung Chi Chou, 12th Edition (1993), each hereby incorporated by reference herein, utilize the remaining plant material and the juice(s) obtained from the plant material to generate various types of: process liquids; solids from the remaining plant material; solids separated from the process liquids during clarification, purification or refining; sugar or sucrose containing juices; crystallized sugar or sucrose; mother liquors from crystallization of sugar or sucrose; by products of the process system; and various combinations, permutations, or derivatives thereof, each having a level of impurities consistent with the process steps utilized in their production, or consistent with conventional standards for that type or kind of product produced, including, but not limited to: animal feeds containing exhausted plant material, such as, exhausted beet cossettes, pulp, or bagasse or other solids or juices separated from process liquids; solid fuel which can be burned to generate steam for electrical power production, or to generate low pressure steam that can be returned to the sugar process system, or to generate low grade heat; syrup ranging from pure sucrose solutions such as those sold to industrial users to treated syrups incorporating flavors and colors, or those incorporating some invert sugar to prevent crystallization of sucrose, for example, golden syrup; molasses obtained by removal of all or any part of the crystallizable sucrose or sugar, or products derived from molasses, one example being treacle; alcohol distilled from molasses; blanco directo or plantation sugars generated by sulfitation using sulfur dioxide (SO2) as a bleaching agent; juggeri or gur generated by boiling sucrose or sugar containing juices until essentially dry; juice sugar from melting refined white sugar or from syrup(s) which may be further decolorized; single-crystallization cane sugars often referred to as "unrefined sugar" in the United Kingdom or other parts of Europe, or referred to as "evaporated cane juice" in the North American natural foods industry to describe a free-flowing, single-crystallization cane sugar that is produced with a minimal degree of processing; milled cane; demerara; muscovado; rapedura; panela; turbina; raw sugar which can be about 94–98 percent sucrose, the balance being molasses, ash, and other trace elements; refined sugars such as extra fine granulated having a quality based upon "bottlers" quality specified by the National Soft Drink Association being water white and at least 99.9 percent sucrose; specialty white sugars, such as, caster sugar, icing sugar, sugar cubes, or preserving sugar, brown sugars that can be manufactured by spraying and blending white refined sugar with molasses which can be light or dark brown sugar depending on the characteristics of the molasses; or powdered sugar made in various degrees of fineness by pulverizing granulated sugar in a powder mill and which may further contain corn starch or other chemicals to prevent caking. This list is not meant to be limiting with respect to the products generated from the juices or process liquids obtained, removed or extracted from plant material, but rather, it is meant to illustrative of the wide variety and numerousity of products that can be generated from conventional process systems or process systems in accordance with the inventions described herein.

As can be understood, process systems, in part, comprise steps that increasingly clarify, purify, or refine process liquids resulting from the diffusion, milling, or other methods used to remove juice from the plant material. Typically, a portion of the insoluble or suspended material in process liquids containing juice derived from plant material can be removed using one or more mechanical processes such as screening. The resulting screened process liquid, when derived from sugar beets may contain about 82%–85% by weight water, about 13–15% by weight sucrose, about 2.0–3.0% by weight dissolved non-sucrose substances or impurities, and some amount of remaining insoluble materials.

Typically, the process liquid obtained by removing juices from plant material, which can have a volume of 1000–2500 gallons per minute, is treated by the gradual addition of a base to increase the pH. In certain conventional process systems, the pH of the process liquid may be raised from a range between about 5.5 pH to about 6.5 pH up to a range of between about 11.5 pH to about 11.8 pH which enables certain non-sucrose substances contained in the process liquid to reach their respective iso-electric points. In conventional sugar process systems, this step is often referred to as "preliming". However, the subsequent use of the term "preliming" is not meant to limit the step of adding base to process liquids solely to the addition of lime, or solely to those process systems that use lime, or solely to those methods that refer to the addition of base as "preliming". Rather, it should be understood that the term "preliming" as used herein includes the step of adding base to process liquids in all various types of processing systems to affect a reduction in concentration of certain soluble components in the process liquid, or to raise the pH of the process liquid, and the term "preliming" can be used to describe the addition of base (lime or otherwise) prior to a filtration step, as described by U.S. Pat. Nos. 4,432,806, 5,759,283, or the like; an ion exchange step as described in British Patent No. 1,043,102, or U.S. Pat. Nos. 3,618,589; 3,785,863; 4,140, 541; 4,331,483; 5,466,294, or the like; a chromatography step as described by U.S. Pat. Nos. 5,466,294; 4,312,678; 2,985,589; 4,182,633; 4,412,866; 5,102,553, or the like; or an ultrafilitration step as described by U.S. Pat. No. 4,432, 806, or the like; phase separation step as described by U.S. Pat. No. 6,051,075, or the like; addition of active materials to the final carbonation vessel as described by U.S. Pat. No. 4,045,242; each reference hereby incorporated by reference herein, or can be used to describe the addition of lime to process liquids to generate precipitates for the purpose of clarifying.

The use of the term "base" involves the use materials that are capable of increasing the pH of a process liquid including, but not limited to, the use of lime or the underflow from processes that utilize lime. The use of the term "lime" typically involves the specific use of quick lime or calcium oxides formed by heating calcium (generally in the form of limestone) in oxygen to form calcium oxide. Milk of lime is preferred in many juice process systems, and consists of a suspension of calcium hydroxide ($Ca(OH)_2$) in accordance with the following reaction:

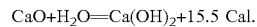

$$CaO+H_2O=Ca(OH)_2+15.5\ Cal.$$

The term "iso-electric point" involves the pH at which dissolved or colloidal materials, such as proteins, within the juice have a zero electrical potential. When such dissolved or colloidal materials reach their designated iso-electric points, they may form a plurality of solid particles, flocculate, or flocs.

Flocculation may be further enhanced by the addition of calcium carbonate materials to juice, which functionally form a core or substrate with which the solid particles or flocculates associate. This process increases the size, weight or density of the particles, thereby facilitating the filtration or settling of such solid particles or materials and their removal from the process liquid.

The resulting prelimed process liquid containing residual lime, excess calcium carbonate, solid particles, flocculants, or flocs, may then be subjected to subsequent process steps as described above. Specifically, with regard to the process system for the clarification, purification, or refining of process liquids from sugar beets, the mixture may first be subjected to a cold main liming step to stabilize the solids formed in the preliming step. The cold main liming step may involve the addition of about another 0.3–0.7% lime by weight of prelimed process liquid (or more depending on the quality of the prelimed juice) undertaken at a temperature of between about 30 degrees Centigrade (° C.) to about 40° C.

The cold main limed process liquid may then be hot main limed to further degrade invert sugar and other components that are not stable to this step. Hot main liming may involve the further addition of lime to cause the pH of the limed juice to increase to a range between about 12.0 pH to about 12.5 pH. This results in a portion of the soluble non-sucrose materials that were not affected by preceding addition of base or lime to decompose. In particular, hot main liming of the limed process liquid may achieve thermostability by partial decomposition of invert sugar, amino acids, amides, and other dissolved non-sucrose materials.

After cold or hot main liming, the main limed process liquid can be subjected to a first carbonation step in which carbon dioxide gas can be combined with the main limed process liquid. The carbon dioxide gas reacts with residual lime in the main limed process liquid to produce calcium carbonate in the form of precipitate. Not only may residual lime be removed by this procedure (typically about 95% by weight of the residual lime), but also the surface-active calcium carbonate precipitate may trap substantial amounts of remaining dissolved non-sucrose substances. Furthermore, the calcium carbonate precipitate may function as a filter aid in the physical removal of solid materials from the main limed and carbonated process liquid.

The clarified process liquid obtained from the first carbonation step may then be subjected to additional liming steps, heating steps, carbonation steps, filtering steps, membrane ultrafiltration steps, chromatography separation steps, or ion exchange steps as above described, or combinations, permutations, or derivations thereof, to further clarify or purify the juice obtained from the first carbonation step resulting in a process liquid often referred to as "thin juice".

This further clarified process liquid or "thin juice" may be thickened by evaporation of a portion of the water content to yield a product conventionally referred to as "syrup". Evaporation of a portion of the water content may be performed in a multi-stage evaporator. This technique is used because it is an efficient way of using steam and it can also create another, lower grade, steam which can be used to drive the subsequent crystallization process, if desired.

The thickened clarified process liquid or "syrup" can be placed into a container, which may typically hold 60 tons or more. In the container, even more water is boiled off until conditions are right for sucrose or sugar crystals to grow. Because it may be difficult to get the sucrose or sugar crystals to grow well, some seed crystals of sucrose or sugar are added to initiate crystal formation. Once the crystals have grown the resulting mixture of crystals and remaining juice can be separated. Conventionally, centrifuges are used to separate the two. The separated sucrose or sugar crystals are then dried to a desired moisture content before being packed, stored, transported, or further refined, or the like. For example, raw sugar may be refined only after shipment to the country where it will be used.

There is a competitive global commercial market for the products derived from sugar process systems as described above. The market for such products has sufficient size that even a slight reduction in the cost of a single process system step can yield a substantial and desired monetary savings. As such, there is great incentive to the sugar industry to perform research to provide improvements for sugar process systems which yield process system savings. Often independent researchers and product distributors are paid for novel process system chemicals, equipment, or process methods, and in some cases a further incentive is provided by additional payments based upon percentage of the savings within the sugar process system due to improvements made.

However, even though process systems for the purification of juice from plant materials have been established and improved upon for at least 1000 years, and specifically with regard to sugar beets, have been improved upon for more than 100 years, and even though there is great incentive to generate improvements relating to sugar process systems, significant problems still remain with regard to the processing of juices obtained from plant material.

A significant problem with conventional sugar processing systems can be the expense of obtaining and adding base, such as calcium oxide, to process liquids to raise the pH of process liquids or to reduce the concentration of acids. As discussed above, calcium oxide or calcium hydroxide may be added to process liquid to raise the pH allowing certain materials in the process liquid to be removed, such as solids, flocculent, or flocs. Calcium oxide is typically obtained through calcination of limestone a process in which the limestone is heated in a kiln in the presence of oxygen until carbon dioxide is released resulting in calcium oxide.

Calcination can be expensive because it requires (as shown by FIG. 5) the purchase of a kiln (40), limestone (41), and fuel (42), such as gas, oil, coal, coke, or the like, that can be combusted to raise the temperature of the kiln sufficiently to release carbon dioxide (43) from the limestone (41). Ancillary equipment to transport the limestone and the fuel to the kiln and to remove the resulting calcium oxide from the kiln must also be provided along with equipment to scrub certain kiln gases and particles from the kiln air exhausted during calcination of the limestone. Naturally, labor must be provided to operate and maintain the equipment, as well as, monitor the quality of the calcined limestone generated and also to monitor the clean up of gases and particulates released during operation of the kiln.

Additionally, the calcium oxide generated by calcination must be converted to calcium hydroxide for use in typical juice process systems. Again this involves the purchase of equipment to reduce the calcium oxide to suitably sized particles and to mix these particles with water to generate calcium hydroxide. Again, labor must be provided to operate and maintain this equipment.

Finally, the investment in equipment and labor associated with the use of calcium oxides incrementally increases as the amount used increases. This may involve the incremental expenditure for the additional labor to mix additional amounts of calcium hydroxide with process liquids, or it may involve an incremental expenditure to use equipment having greater loading capacity or having greater power, or the like.

Another significant problem with the production of and use of base, such as lime, in conventional sugar process systems can be disposal of excess base, spent lime, or process byproducts formed with added base. For example, when the process system uses one or more carbonation steps in clarifying or purifying juice, the amount of calcium carbonate or other salts formed, often referred to as "spent lime", will be proportionate to the amount of lime added to the process liquid. Simply put, the greater the amount of lime added to the process liquid, generally the greater the amount of precipitates formed during the carbonation step. The "carbonation lime" may be allowed to settle to the bottom of the carbonation vessel forming what is sometimes referred to as a "lime mud". Lime mud can be separated by a rotary vacuum filter or plate and frame press. The product formed is then called "lime cake". Lime cake or lime mud is largely calcium carbonate precipitate but may also contain sugars, other organic or inorganic matter, or water. These separated precipitates are almost always handled separately from other process system wastes and may, for example, be slurried with water and pumped to settling ponds or areas surrounded by levees or transported to land fills.

Alternately, the carbonation lime, lime mud, or lime cake can be recalcined. However, the cost of a recalcining kiln and the peripheral equipment to recalcine spent lime can be substantially more expensive than a kiln for calcining limestone. Furthermore, the quality of recalcined "carbonation lime" can be different than calcined limestone. The purity of calcined limestone compared to recalcined carbonation lime may be, as but one example, 92% compared with 77%. As such, the amount of recalcined lime required to neutralize the same amount of hydronium ion in juice may be correspondingly higher. Also, the carbon dioxide content of spent lime can be much higher than limestone. As such, not only can recalcined lime be expensive to generate, it can also require the use of substantially larger gas conduit to transfer the generated $CO_2$ from recalcining spent lime, larger conveying equipment to move the recalcined lime, larger carbonation tanks, or the like.

Also whether spent lime is disposed of in ponds, landfills, or by recycling, the greater the amount of lime utilized in a particular process system, generally the greater the expense of disposing the spent lime.

Another significant problem with conventional sugar processing systems that use base or lime to purify or clarify process liquids may be an incremental decrease in process system throughput corresponding with an incremental increase in the amount of lime used in processing liquids. One aspect of this problem may be that there is a limit to the amount of or rate at which lime can be produced or provided to juice process steps. As discussed above, limestone must be calcined to produce calcium oxide prior to its use as a base in juice process systems. The amount of lime produced may be limited in by availability of limestone, kiln capacity, fuel availability, or the like. The rate at which lime can be made available to the juice process system may vary based on the size, kind, or amount of the lime generation equipment, available labor, or the like. Another aspect of this problem can be that the amount of lime used in the process system may proportionately reduce volume available for juice in the process system. Increased use of base, such as lime, may also require the use of larger containment areas, conduits, or the like to maintain throughput of the same volume of juice.

The amount of base or lime used during conventional sugar processing depends in part upon the amount of acids associated with the plant material at the time of removal or extraction of the juice. Organic acids act as a buffering system in the acid-base equilibrium of the plant cell, in order to maintain the required pH value in the plant tissue. The origin of these acids can be divided into two groups, the first, are acids taken up by the plant from the soil in the course of the growing cycle, and the second, are acids formed by biochemical or microbial processes. When the uptake of acids from the soil is insufficient, plants may synthesize organic acids, primarily oxalic acid, citric acid and malic acid, to maintain a healthy pH value of the plant cell juice. As such, juice extracted from the plant tissue will contain a certain amount of various organic acids. In addition to this naturally occurring amount of organic acids within the plant tissue, acids may be formed during storage primarily by microbial processes. Badly deteriorating plant material may generate large amounts of organic acids, primarily lactic, acetic acid, as well as citric acid. The total acid content within the plant tissue can increase threefold, or more, under certain circumstances.

Additionally, carbon dioxide ($CO_2$) can be generated in the plant tissues due to breakdown of the natural alkalinity in the juice. In this process, bicarbonate ion and carbonate ion are converted to carbon dioxide. The resulting carbon dioxide, to the extent it remains in solution, generates carbonic acid that provides a source of hydronium ion. Organic acids contained within the plant cell juice, in whole or in part, remain within the juice obtained from the plant material. As such, to raise the pH of the process liquid containing juice, these acids must be neutralized with base. The higher the concentration of such acids in the process liquid, the greater the amount of base required to raise the pH of the process liquid to a desired value.

Moreover, plant materials, juice(s), or process liquids treated with antimicrobial chemicals can have higher acid content then untreated plant materials or juices. For example, sulfur dioxide ($SO_2$) or ammonium bisulfite ($NH_4HSO3$) can be added continuously or intermittently to help control microbial growth or infection. The amount of $SO_2$ or $NH_4HSO_3$ added depends on the severity of the microbial growth or infection. Lactic acid and nitrite levels can be monitored or tracked to determine severity of growth or infection. Up to about 1000 ppm of $SO_2$ can be used to shock or treat an infected system. Up to 400–500 ppm can be fed continuously to control an infection. The $SO_2$ or $NH_4HSO_3$ addition used for antimicrobial protection can further lower the pH and alkalinity of juice(s) or process liquids. The alkalinity reduction may occur due to conversion of naturally occurring bicarbonate ions to $CO_2$ and carbonic acid.

Another significant problem with conventional sugar process systems may be that juice(s) or process liquids may contain other undesired components, or components that are at concentrations that are undesirably high. These undesired components may include components of natural origin such as fermentation products, such as ethanol, isobutanol, isoamyl alcohol, propanol, other volatile or semi-volatile organic compounds, or the like. Alternately, undesired components may be of non-natural origin such as antimicrobial agents, anti-foaming agents, or the like. These undesired components are typically reduced in concentration during liming steps, or evaporation steps, or removed as part of the mother liquor of crystallization.

Another significant problem with conventional sugar processing systems may be the formation of scale in containment vessels, such as, evaporators or sugar crystallization equipment. The calcium salt of oxalic acid often forms the main component of scale. Oxalate has low solubility in solution and that solubility can be reduced as the amount of calcium in solution increases. Even after juice purification to "thin" or "thick" juices there can be sufficient calcium in solution to force oxalate out of solution. The process of removing scale from the surfaces of equipment can be expensive, including, but not limited to, costs due to production slowdowns and efficiency losses, or the reduction in the effective life of equipment.

Another significant problem with convention sugar processing systems may be the lack of recognition that juice extraction equipment or processes used to obtain juice from plant material can lower the pH of the extracted juice. With respect to diffusors used to extract juice from sugar beet root, there may have been a failure to recognize that the pH value of sugar beet juice or process liquids can be significantly lowered during the diffusion process. Another aspect of this problem may be that there has been a lack of recognition that different diffusion apparatus or different diffusion methods used to remove juice from sugar beet material differentially alters or reduces the pH of the juice or process liquid obtained. To the extent that improvements in diffusion technology have resulted in increasingly lower pH values of the juice or process liquid obtained, these apparatuses and methods teach away from the solutions provided by the invention.

Another significant problem with conventional sugar processing systems may be that organic compounds, inorganic compounds, organic acids, inorganic acids, dissolved gases, or other materials contained within extracted juice or process liquids, whether of natural origin or added to the extracted juice or process liquids, may not be allowed to move toward equilibrium to with atmospheric partial pressures of gases, or other mixture of partial pressures of gases to the extent possible or desirable. As such, an amount of these various components that could have been transferred from the juice or process liquid to the atmosphere or other mixture of partial pressures of gases remain in the juice or process liquid. The increased concentration of these components can contribute to lower pH of the juice or process liquid or remain in the process liquid to precipitate, form scale, or necessitate removal in subsequent process system steps. Lower pH can result in the use of additional base or lime, as described above, to achieve the desired pH of the juice.

One aspect of this problem with respect to conventional diffusion of sugar beet cossettes (or other conventional methods of removing or extracting juice or material(s) from plant material(s)) may be that conventional diffusion equipment (or other conventional equipment used to remove or extract juice or other materials from plant material(s)) does not provide, or provides an inadequate, process liquid-gas interface between the diffusion juice(s) or process liquids and atmospheric partial pressure of gases, or other present mixture of partial pressures of gases. Whether due to the equipment used or the method employed conventional process systems do not allow transferable components in the process liquid to move toward an equilibrium with existing or atmospheric partial pressures of gases that would substantially reduce the concentration of such components in the diffusion juice or process liquids.

A second aspect of this problem may be that conventional sugar process methods or equipment (or other conventional equipment used to remove or extract juice or other materials from plant material(s)) do not provide sufficient re-circulation of atmospheric partial pressures, or other desired or selected partial pressures of gases, within process equipment to maintain a sufficient difference in partial pressures between the concentration of material(s) in the juice or process liquid and the partial pressures of gases presented at the process liquid-gas interface to generate a concentration gradient effective in achieving the desired, potential, or possible mass transfer of materials to effect the desired, potential, or possible reduction of pH in the juice or process liquid. As such, a desirable equilibrium or complete equilibrium between the partial pressures of gases presented at the process liquid-gas interface and the partial pressures of materials can be prevented or slowed which in turn can generate juice or process liquids that require more base or lime addition to reach a desired pH value or contain an incremental amount of additional material that must be removed in subsequent processing steps.

A third aspect of this problem may be that conventional sugar process methods or equipment (or other conventional equipment or methods used to remove or extract juice or other materials from plant material(s)) do not sufficiently mix juice or process liquids to allow the entire volume, or a sufficient volume, to move toward equilibrium with the atmosphere or other mixture of gases presented at the process liquid-gas interface.

A fourth aspect of this problem may be that conventional sugar process methods or equipment (or other conventional equipment or methods used to remove or extract juice or other materials from plant material(s)) do not heat the juice(s) or other process liquids to a temperature that sufficiently reduces the solubility of undesired components in the juice or process liquid to allow sufficient mass transfer of such undesired components from the juice or process liquid to the partial pressures of gases presented at the process liquid-gas interface, or move the point of equilibrium such that the concentration of pH reducing materials can be reduced to the desired, potential, or possible concentration, or move toward or equilibrate with the partial pressure of gases presented to the process liquid-gas interface at the rate desired, or at the potential or possible equilibration rate that may be desired or achieved.

Another significant problem with conventional sugar processing systems may be that extracted juice(s) or process liquids are allowed to move toward equilibrium or equilibrate with atmospheric partial pressures or with other mixture of gases having higher concentration of undesired components or pH reducing materials as the extracted juice or process liquid cools. As extracted juice, such as diffusion juice, or process cool the solubility of atmospheric gases or other mixture of gases presented at the process liquid-gas interface can increase. As such, the undesired gases or other volatile materials can be transferred into the juice (including but not limited to pH reducing materials) may increase as the diffusion juice cools. As but a single example, solubility of atmospheric $CO_2$ increases as diffusion juice cools from a range of between about 55° C. to about 70° C. during diffusion steps to a range of temperature between about 20° C. to 30° C. prior to the pre-liming or liming steps. Exposure to atmospheric partial pressures of $CO_2$, or any mixture of gases having sufficient partial pressure of $CO_2$ to allow transfer of $CO_2$ to the juice as it cools, increases the concentration of $CO_2$ in the diffusion juice relative to that amount present at higher temperatures. The increased concentration of $CO_2$ in the diffusion juice may reduce the pH of the juice. As such, the increased concentration of $CO_2$ or other gases in the diffusion juice may require addition of greater amounts of lime during subsequent lime addition, pre-liming or other liming steps to achieve a desired or necessary pH.

Another significant problem with conventional sugar processing systems may be that the partial pressures of gases presented at the process liquid-gas interface are not effective in establishing a concentration gradient sufficient to transfer, move, or remove the necessary or desired portion of materials or components from the diffusion juice or other process liquid or to substantially increase the pH of the diffusion juice or reduce the concentration of pH reducing materials in the diffusion juice.

The present invention provides a juice process system involving both apparatuses and methods that address each of the above-mentioned problems.

III. DISCLOSURE OF INVENTION

Accordingly, a broad object of the invention can be to provide a sugar process system to generate products from sucrose containing liquids or juices obtained from plant material. One aspect of this broad object can be to provide an alternative to conventional juice or sugar process system(s). As such, the invention can provide an entire process system, including both apparatus and methods, to generate products from sucrose containing liquids or juice. A second aspect of this broad object of the invention can be to provide juice or sugar process system methods compatible with conventional juice or sugar process systems. As to this second aspect, the invention provides method steps and apparatus that can be added to, replace, or modify certain components or steps within conventional juice or sugar process systems.

A second broad object of the invention can be to reduce the cost of generating products from sucrose containing process liquids or juices. One aspect of this object of the invention can be to increase juice process throughput that may be, in whole or in part, limited by availability of base, such as a reduced availability of limestone or the a lack of capacity to convert limestone to calcium oxide, or the like. Another aspect of this object can be to provide a cost savings by reducing the amount of base, such as lime, that has to be used to process sucrose containing liquids or juice into products. A third aspect of this object of the invention can be to reduce the amount of waste generated, such as a reduction in the amount of spent lime.

A third broad object of the invention can be to provide a sucrose containing liquid product or juice product resulting from use of the invention. One aspect of this object can be to provide a sucrose containing process liquid or juice product having a reduced amount or reduced concentration of material(s) in solution, such as reduced concentrations of acids; volatile or semi-volatile compounds; gases (e.g. $CO_2$ or $SO_2$); ammonia; or the like. A second aspect of this object can be to provide a sucrose containing process liquid or juice product that has a higher pH value after treatment in accordance with the invention. A third aspect of this object can be to provide a sucrose containing process liquid or juice product that has a higher pH value after treatment in accordance with the invention without the use of any base. A fourth aspect of the invention can be to provide a sucrose containing process liquid or juice product that has a higher pH even when an amount of base, such as lime, or the underflow from conventional processing of juice, or the like, has been added prior to treatment in accordance with the invention. A fifth aspect of this object can be to provide a sucrose containing process liquid or juice product that has a reduced capacity to generate hydronium ion. A sixth aspect of this object of the invention can be to provide a sucrose containing process liquid or juice product that requires less base to: raise the pH to a desired value, iso-electric focus material(s) in solution, perform preliming or main liming steps in conventional process systems, degrade invert sugars, or otherwise generate products from sucrose containing liquids or juices.

Another fourth broad object of the invention can be to provide methods and apparatuses that reduce the amount or concentration of dissolved material in process liquids or juice obtained from plant material by conventional juice extraction procedures such as pressing, milling, or diffusion. One aspect of this object can be to provide a method of reducing the amount or concentration of material(s) in solution without the addition of base, necessitating the addition of base, or prior to the addition of base, such as lime. A second aspect of this object can be to provide a method that can be used prior to, in conjunction with, or after, the addition of base (including, but not limited to, lime) to sucrose containing liquids or juices to reduce the amount or concentration of material(s) in solution. A third aspect of this object can be to provide a method that assists in reducing the amount or concentration of material(s) (organic, inorganic, volatile, or semi-volaile) in sucrose containing process liquid or juice. A fourth aspect of this object can be to provide method(s) of and apparatuses for reducing material in sucrose containing process liquids or juices compatible with conventional juice clarification or purification methods, including but not limited to, preliming, main liming, ion exchange, or filtering, as above described.

A fifth broad object of the invention can be to provide various apparatus and methods to increase the process liquid-gas interface between sucrose containing process liquid or juice and a desired partial pressures of gases.

A sixth broad object of the invention can be to provide various apparatuses that inject, introduce, or otherwise mix desired partial pressures of gases with process liquid or juice obtained from plant material. One aspect of this object of the invention can be to provide an apparatus to introduce a desired mixture of gases into process liquid or juice to provide a mixed volume or mixed stream of juice comprising the juice (or process liquid) and the desired partial pressures of gases.

A seventh broad object of the invention can be to provide various apparatuses to separate or remove partial pressures of gases mixed with or that have come to partial or complete equilibrium with the components or material(s), or partial pressures of gases, in solution, contained by, or dissolved within, the process liquid or juice.

An eighth broad object of the invention can be to assess, monitor, generate, or maintain process liquid(s) at a temperature, temperature profile, or temperature adjusted (either manually or automatically) in response to or with respect to: an elapse of time; a concentration of any particular material(s) or component(s) in solution or contained therein; a specific process(es) or step(s) to extract, purify, or otherwise process liquids obtained from plant material; method of extracting, removing, or diffusing such materials from such plant material; or any manner of process, preparation, or storage of such juice or process liquid to establish a range or specific value(s) of solubility to materials to control the concentration of materials that reduce or can reduce pH of process liquids or juice.

A ninth broad object of the invention can be to provide apparatuses or methods of treating juice or process liquids containing materials extracted or removed from plant material to prevent, minimize, or control the partial pressures of gases that are presented at the process liquid-gas interface, including those partial pressures of gases presented prior to the initial addition of base (including, but not limited to lime) or subsequent additions of base.

A tenth broad object of the invention can be to provide apparatuses and methods that allow the desired or necessary volume of juice to interact with the process liquid-gas interface to allow the desired or necessary transfer of materials from the diffusion juice to atmospheric partial pressures or selected partial pressure of gases.

Naturally, further objects of the invention are disclosed throughout other areas of the specification and drawings.

IV. BRIEF DESCRIPTION OF DRAWINGS

V. MODE(S) FOR CARRYING OUT THE INVENTION

Figure 1:
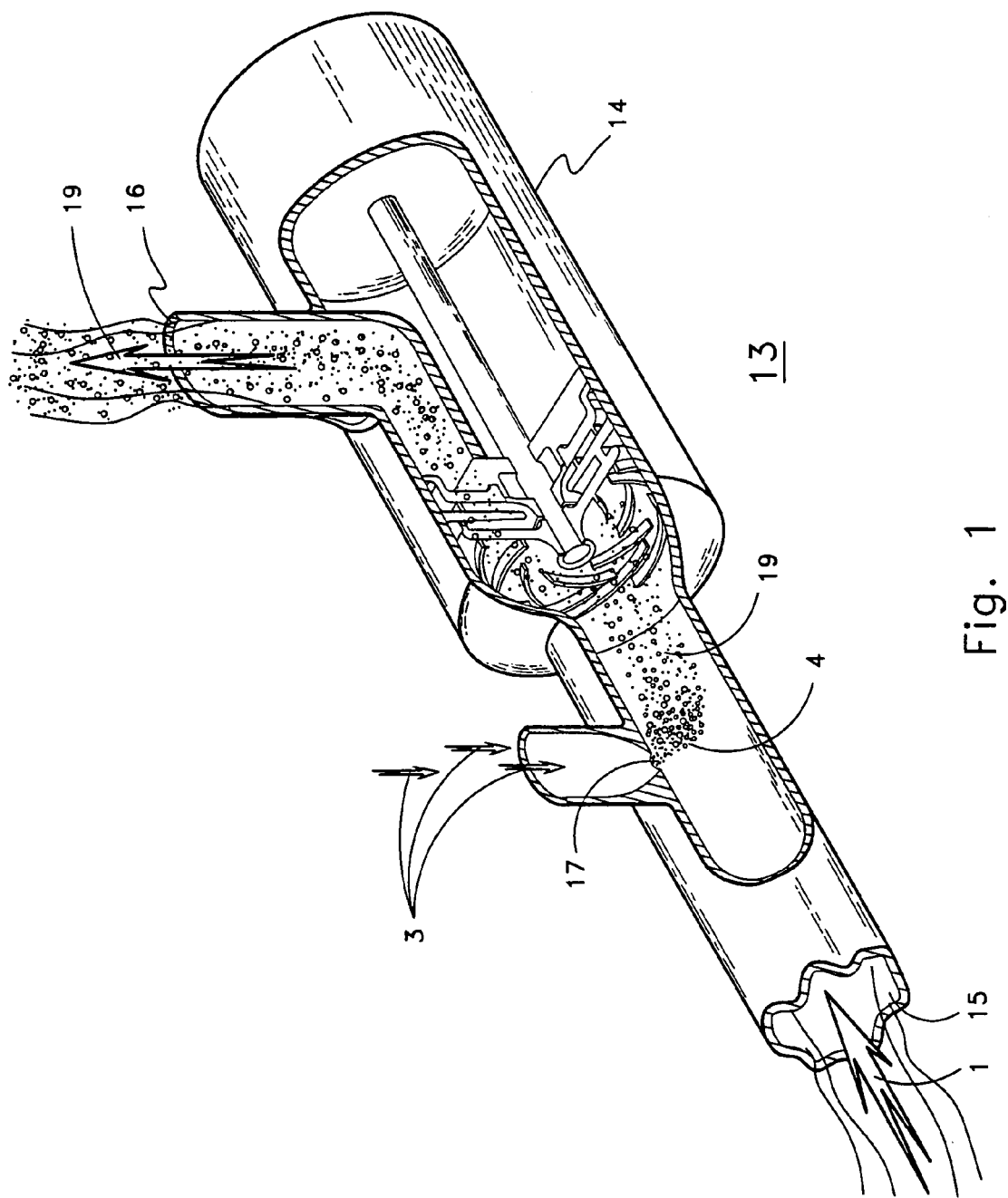
FIG. 1 shows an embodiment of the invention by which a mixture of gases can be delivered to a stream of juice or process liquid to generate a mixed stream of juice or mixed stream of process liquid.

Generally, the invention involves a juice process system to purify juice without addition of base or with reduced addition of base prior to evaporation of excess water content or fractional crystallization of sucrose. Specifically, the invention provides juice having reduced dissolved material, reduced dissolved gases, higher pH, or lower acidity for use in juice process systems.

As discussed above juice can be obtained from plant material such as sugar beets, sugar cane, sweet sorghum, or the like. Naturally, there may be large commercial markets or niche markets for products that necessitate obtaining juice from other types of plant material and it should be understood that the invention is not limited to juice removed, extracted, or obtained from any particular type of plant, or any portion of the plant or plant material harvested. Moreover, the term juice can be broadly understood to be any sucrose containing juice or liquid at, or from, any step in any process system prior to sugar crystallization. As such, sucrose containing liquids obtained from plant material by milling or pressing steps, or the juice resulting from the steps of diffusing the plant material, as but two examples, are juice. As further described above, the term juice includes liquid containing sucrose, non-sucrose substances, and water that can occur in various proportions depending on the nature of the plant material and the steps used to remove juice from the plant material. It may be desirable to remove all or a portion of the dissolved materials because they are highly colorized, thermally unstable, or otherwise interfere with certain processing steps or adversely impact the quality or quantity of the sugar product resulting from the purification process. The sucrose containing liquids resulting from these various clarification or purification steps are also included in the term juice.

Particular embodiments of the invention involve the removal of at least a portion of the dissolved materials, volatile materials, dissolved gases, aqueous acids, or the like, such as carbon dioxide or sulfur dioxide that can form aqueous acids that generate hydronium ion in solution, change the concentration of hydronium ion in the juice, or lower the pH of the juice.

For example, when juice contains sufficient cations, hydroxide ion $OH^-$ can act as a anion, which enables carbon dioxide $CO_2$ to dissolve into the juice as carbonate ions $(CO_3)^{-2}$, or as bicarbonate ions $HCO_3^-$. The dissociation of $HCO_3^-$ provides a very weak acid. However, when juice contains an insufficient number of cations to allow dissolved $CO_2$ to form carbonate or bicarbonate ions, an equilibrium results between carbon dioxide and carbonic acid $H_2CO_3$. Carbonic acid can act as a strong acid in the pH range that juice is obtained. The consequent production of hydronium ion increases the existing concentration in the juice resulting in values of pH that can be lower.

Similarly, sulfur dioxide ($SO_2$) or ammonium bisulfite ($NH_4HSO_3$) can be introduced into the juice to control, reduce, or eliminate microbiologic activity, sucrose hydrolysis, formation of invert sugars, or loss of sucrose, or to adjust pH lower. Again, when juice contains sufficient cations, such as calcium, sulphites, such as calcium sulfite can result. However, when juice contains an insufficient number of cations to allow dissolved sulfur dioxide ($SO_2$) to form sulphites, an equilibrium results between sulfur dioxide (SO2), sulfurous acid ($H_2SO_3$), and sulfuric acid ($H_2SO_4$). Sulfuric acid and sulfurous acid can act as strong acids. The consequent production of hydronium ion increases the existing concentration in the juice resulting in values of pH that can be lower.

Additionally, other aqueous acids can be generated by the plant during normal growth and other acids are generated by microbial activity including, but not limited to, phosphoric acid, hydrochloric acid, sulfuric acid, citric acid, oxalic acid, succinic acid, fumaric acid, lactic acid, glycolic acid, pyrrolidone-carboxylic acid, formic acid, acetic acid, butyric acid, maleic acid, lactic acid, or the like.

Moreover, other dissolved materials, such as ammonia $NH_3$, can be generated by the breakdown of amino acids or by the conversion of materials added to the juice such as ammonium bisulfite.

Removal of volatiles from aqueous solutions, such as drinking water, is usually modeled under steady state conditions by the two-film theory as described by Ninnalakhadan, N., Jang, W., and Speece, R. E., "Counter-Current Cascade Air-Stripping for Removal of low volatile organic contaminants", Wat. Res. 24: 615–623, 1990, hereby incorporated by reference herein. This theory of volatile mass transfer rate across a liquid-gas interface can be adapted to describe the mass transfer rate of components contained in juice obtained from plant material to partial pressures of gases presented at a juice-gas interface or process liquid-gas interface.

Now referring primarily to FIG. 1, an embodiment of the invention can comprise exposing juice (1) or process liquids obtained from plant material (2) to a mixture of gases (3) in a manner that generates an increased process liquid-gas interface area (4) between the juice (1) or process liquid and the mixture of gases (3). By generation of the increased process liquid-gas interface area (4) between the juice (1) and the mixture of gases (3), the transfer rate of various types of dissolved materials (5) from the juice (1) or process liquid to the mixture of gases (3) can be increased as the concentration of each component of the dissolved material (5) moves toward equilibrium with the concentration of that component in the mixture of gases (3). The mixture of gases or stripping gas can be selected to provide the desired partial pressures necessary to allow transfer of the undesired dissolved material (5) from the juice (1) or process liquid to the mixture of gases (3). The mixture of gases (3) can be refreshed, or the partial pressures of the gases adjusted, continuously or periodically, at the increased interface surface area (4) with the juice (1) to prevent equilibrium between the mixture of gases (3) and the dissolved material (5) from occurring, thereby maintaining transfer of dissolved material (5) from the juice or process liquid to the mixture of gases (3).

When the invention is utilized dissolved materials, semi-volatile materials, or volatile materials in juice or process liquid, such as, volatile inorganic compounds, volatile organic compounds, or dissolved gases (e.g. alcohols, carbon dioxide, sulfur dioxide, or ammonia) can be removed from the juice or process liquid. The juice product resulting from use of the invention can have reduced dissolved material, reduced dissolved gases, reduced capacity to generate hydronium ion, or a decreased concentration of hydronium ion, lower acidity, or a higher pH as compared to the same juice without application of the invention. As but one example, the concentration of carbon dioxide in the juice can be reduced substantially when atmospheric partial pressures are used to strip the juice. The pH of the juice product resulting from the process can have a pH value that is higher by 0.05 pH, 0.1 pH, 0.2 pH, 0.3 pH, 0.4 pH, 0.5 pH, 0.6 pH, 0.7 pH, 0.8 pH, 0.9 pH, 1.0 pH, 1.1 pH, 1.2, pH 1.3, pH 1.4, pH 1.5, pH 1.6, pH 1.7, pH 1.8, pH 1.9, 2.0 pH, however, any upward adjustment of the pH value from the initial pH value of the untreated juice can result in a substantial monetary savings and can be important commercially. The actual amount of upward adjustment of the pH value from the initial pH value generally depends upon the kind and quality of juice treated by the invention, the extent of the increased interface surface area generated throughout the volume of juice, the duration of time the mixture of gases is responsive to the increased interface surface area generated, and the partial pressures provided in the mixture of gases. As such, the upward adjustment of the pH value can vary with respect to the embodiment of the invention utilized. For example, varying the volume or amount of juice treated per unit time, but otherwise using the same embodiment of the invention, can yield a different increment in change of the pH value.

The invention can further comprise the step of reducing the amount of base added per unit weight or unit volume of the juice treated with the invention to achieve a necessary or desired pH, concentration of hydronium ion, or acidity as compared to untreated juice or conventional process treated juice. The amount of base added after reducing dissolved material in the juice by treatment with the invention can be substantially less to establish a desired pH value, such as, between about 11.0 to about 12.0, or between 11.5 to about 12.5, or the range of pH used to "prelime", "main lime", "intermediate lime, or to establish a pH value corresponding to the iso-electric point of any particular non-sucrose substance in the juice, or required to adjust the acidity or alkalinity of the juice to a desired concentration. With respect to lime usage, for example, a reduction of up to about 30% can be achieved by using the various embodiments of the invention as compared to untreated juices or conventional process treated juices.

Figure 2:
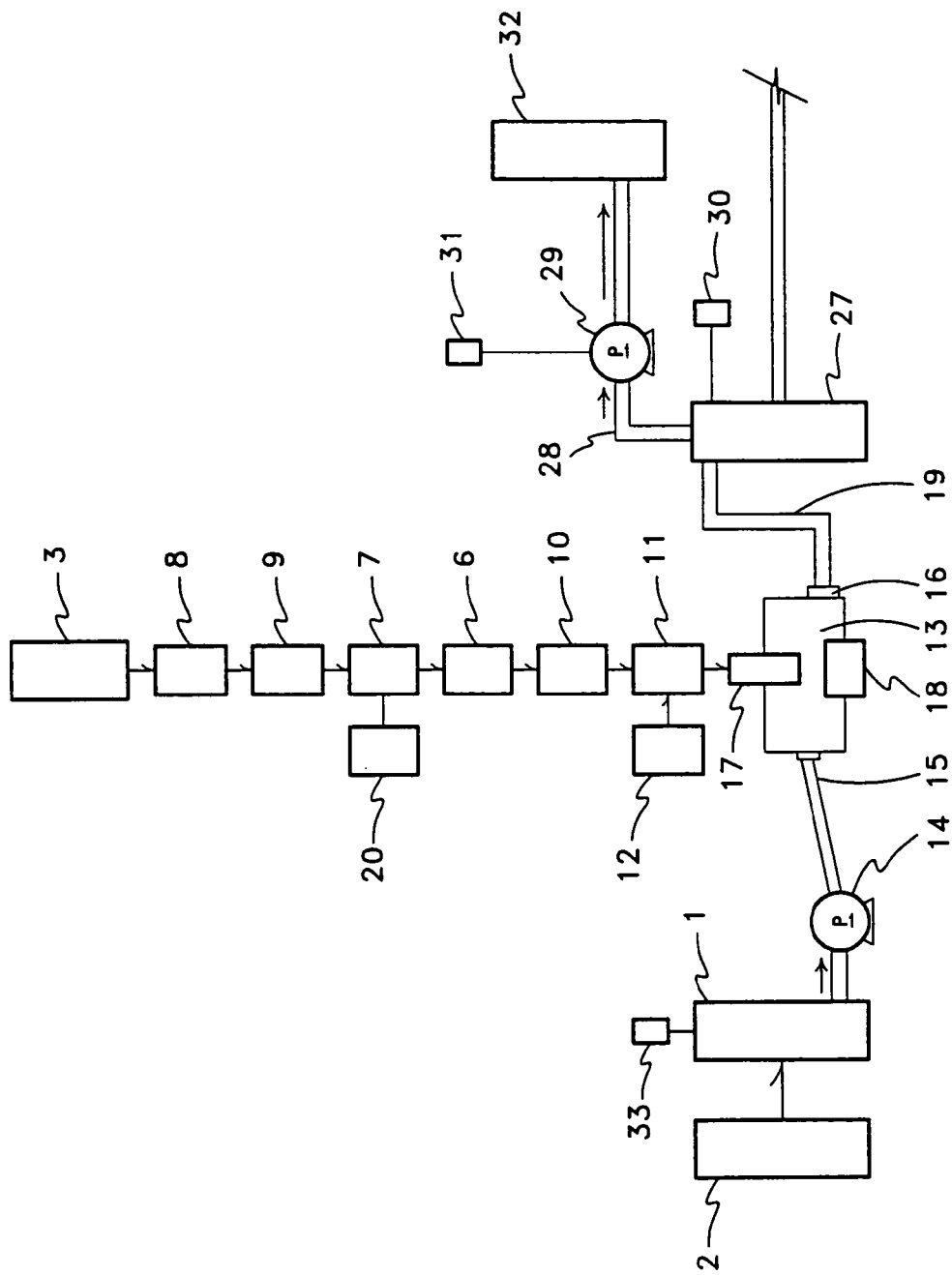
FIG. 2 shows a particular embodiment of the invention to produce juice or process liquid having a reduced concentration of certain components or materials therein.

Now referring primarily to FIG. 2, embodiments of the invention can comprise a mixture of gases (3) that can comprise atmospheric gases, or air; atmospheric gases or air that have been passed through one or more filters to reduce, or to substantially eliminate, non-biological particulate or biological particles (such as bacteria, viruses, pollen, microscopic flora or fauna, or other pathogens); atmospheric gases or air that have been passed through chemical scrubbers or otherwise processed to generate a desired concentration or range of concentrations of partial pressures of gases; purified gases; or combinations or permutations thereof.

Particular embodiments of the invention can further include a gas filter (6) responsive to the flow of the mixture of gases (3). The gas filter (6) can be located before, or can be located after, a gas flow generator (7) made fluidicly responsive to the mixture of gases (3). The gas filter (6) responsive to the flow of the mixture of gases (3) can comprise a Hepa filter, or a Ulpa filter, or other type of macro-particulate or micro-particulate filter. Additional pre-filters may also be used to capture particles in the mixture of gases prior to entering the gas flow generator (7), or may be used after the gas flow generator but prior to the gas filter (6).

An unfiltered mixture of gases (3) can be drawn into a first stage prefilter (8) then through the second stage prefilter (9) and then through the gas flow generator (7). The prefiltered mixture of gases can then flow through the gas filter (6) (Hepa filter, or Ulpa filter, or other type filter). The resulting filtered mixture of gases (up to 99.99% of all particles as small as about 0.3 microns removed from the mixture of gases (3) when a Hepa filter is used, and up to 99.99% of all particles as small as about 0.12 microns removed from the mixture of gases (3) when a Ulpa filter is used) can then be made to generate or be responsive to the increased interface surface area (4) between the juice (1) and the mixture of gases (3). As to other embodiments of the invention, the mixture of gases (3) or the juice (1) can be exposed to short wavelength ultraviolet radiation source (10) in order to reduce the number of pathogen particles or bacterial particles. The invention can further comprise temperature control means (11) for establishing a desired temperature of the mixture of gases (3) prior to making them responsive with the juice (1) or the increased interface surface area (4). The temperature control means (11) can be made responsive to a temperature sensor (12) that can detect the temperature of the mixture of gases (3) or the juice (1) and can signal or cause the temperature control means (11) to adjust the temperature of the mixture of gases (3) or the juice (1), or both, to a desired temperature.

With respect to certain embodiments of the invention, the mixture of gases (3), whether filter or unfiltered, can be used to form or assist in the formation of the increased interface surface area (4). For example, juice (1) can be transferred to a gas injector (13) by gravity feed or transferred under pressure generated by a pump (14) or other liquid transfer element. The gas injector (13) can have an inlet port (15) through which juice (1) enters the gas injector (13), an outlet port (16) from which juice (1) exits the gas injector (13), and at least one injection port (17) through which the mixture of gases (3) can be delivered into at least a portion of the volume of juice (1) contained within or passed through the gas injector (13).

When the gas injector (13) has a configuration for batch processing of juice (the gas injector is periodically filled and emptied) the inlet port (15) and the outlet port (16) can, with respect to certain embodiments of the invention, be the same port. When the gas injector (13) has a configuration for pulsatile flow processing (the flow of the juice (1) can be periodically diminished or interrupted to increase residence time of the juice (1) in or responsive to the gas injector (13)), or continuous flow processing (a stream of juice (1) flows continuously through the gas injector (13) although the rate or volume of juice (1) flowing through the gas injector (13) may be adjusted) the inlet port (15) and the outlet port (16) can be discrete.

As to each embodiment of the invention, the mixture of gases (3) can be injected into the juice (1) with a sufficient volume, at a sufficient pressure, or with a pattern of distribution (e.g. diffused or as small bubbles) to generate the desired increased interface surface area (4) between the juice (1) and the mixture of gases (3). The increased interface surface area (4) can provide the interface at which at least a portion of the dissolved material (5) in the juice can transfer from the juice (1) to the mixture of gases (3).

The gas injector (13) whether configured to operate as a batch, pulsatile, intermittent, or continuous embodiment of the invention, can further agitate, move, stir or otherwise provide mixing means (18) to further distribute the mixture of gases (3) into the juice (1) to further generate the increased interface surface area (4). Where the configuration of the gas injector (13) generates a stream of juice (1), whether continuous, pulsatile, or discontinuous, injecting the mixture of gases (3) into the juice (1) can generate a mixed stream of juice (19). The mixture of gases in the mixed stream of juice (19) may be further distributed in the mixed stream of juice (19) by further extensions, channels, or the like coupled to the interior surface of the gas injector (13). The extensions or channels can be oriented to create a desired perturbation of the stream of juice within the gas injector (13). The invention can further provide a injection pressure adjustment means (20) to which the gas flow generator (7) can be responsive to increase or decrease the pressure or volume of the mixture of gases (3) injected, mixed, or sparged into the juice (1). In some embodiments of the invention, the injection pressure adjustment means (20) can individually or in combination comprise a variably adjustable restriction means located between the gas flow generator (7) and the injection port (17).

The invention, with respect to certain embodiments, can generate total dissolved gases within the juice greater than the initial concentration in the juice. This can be up to about 10 times the concentration that would be obtained by saturating the juice at atmospheric pressure. The pressure of the mixture of gases (3) injected into the juice (1) can be between the initial pressure exerted by the juice (1) to about a pressure of about 20 bars.

Multiple gas injectors (13) can be used in series or in parallel, and each gas injector can have multiple gas injection ports (17) at substantially the same location or different locations in a series or in parallel. Each injection port (17) may be separately or variably controlled with respect to the volume and pressure of the mixture of gases (3) injected in the juice (1). The variably adjustable injection ports (17) can be made responsive to the volume of juice (1), the residence time of the juice in the gas injector (13), the concentration or amount of dissolved materials (5) in the juice (1), or the concentration of dissolved gases in the juice (1), or the like.

With respect to other embodiments of the invention, the mixture of gases (3) can be injected into the juice (I) prior to the pump (14), whereby the pump (14) can act to distribute the mixture of gases (3) with the stream of juice (1) to generate the mixed stream (19) and increased interface surface area (4). As to certain types of pumps, the mixed stream (19) can comprise at least 35% mixture of gases with substantially 100% saturation of the stream of juice (1) with bubbles of the mixture of gases (3). As but one example, a Shanley Pump, can be used to generate the mixed stream (19). Shanley Pump, hereby incorporated by reference herein. A plurality of pumps (14) can be run in series or parallel as required to process a certain volume of juice (1) within the desired duration of time.

With respect to other embodiments of the invention, a stream of juice (1) can be further configured to provide a venturi effect, or otherwise develop a reduced pressure responsive to the stream of juice (1) to draw the mixture of gases (3) into the stream of juice (1), whether pulstile, continuous, or intermittent.

With respect to certain embodiments of the invention, only a portion of the stream of juice (1) may be exposed to the mixture of gases (3). For example, if the juice (1) contains a low amount of dissolved material (5), then the stream of juice (1) can be split and only a portion of the juice (1) exposed to the mixture of gases (3). The streams of juice (1) can then later be recombined in the proportions desired.

Figure 3:
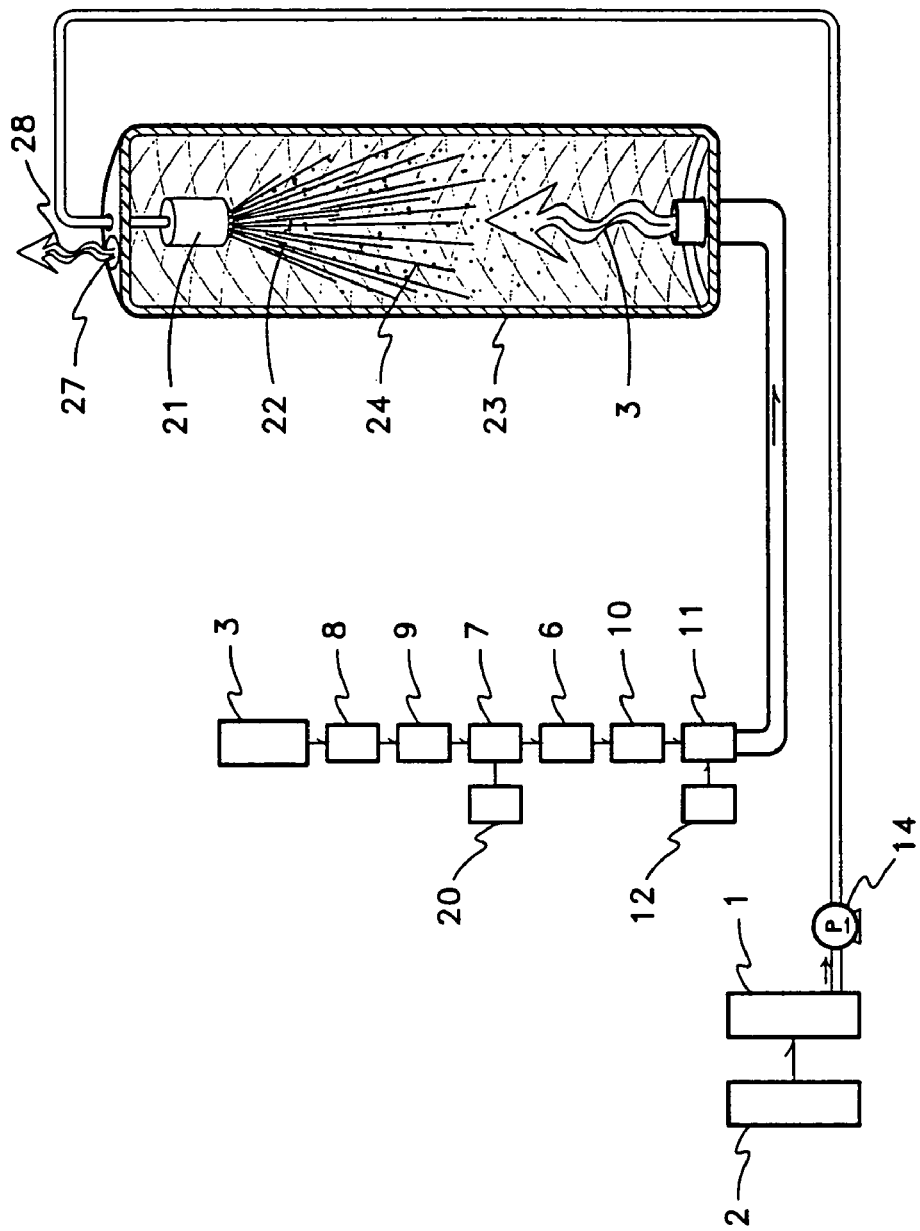
FIG. 3 shows a particular embodiment of the invention to produce juice or process liquid having a reduced concentration of certain components or materials therein.

Now referring primarily to FIG. 3, with respect to other embodiments of the invention, juice (1) can be sprayed through a juice distribution element (21), such as a nozzle. The juice distribution element (21) can create a spray of very fine juice droplets (22) or particles. As such, spraying generates an increased interface surface area (4). The juice can be sprayed in an aeration containment element (23) and the mixture of gases (3), whether or not filtered or scrubbed as described above, can be exposed to the sprayed juice droplets. Juice can be discharged into the top region of the aeration containment element (23) (e.g. via a spray nozzle) and then exposed to the mixture of gases (3) passed through the aeration containment element (23). The mixture of gases (3) can be passed through the aeration containment element (23) counter current to the direction of the of the juice droplets (22) to increase the efficiency of transfer of dissolved material (5) in the juice (1) to the mixture of gases (3). The aeration containment element (23) can be, for example, a 150 gallon tank but it can be appreciated that the size and shape of this tank can vary depending upon the quantity of the juice that is being processed.

In certain embodiments of the invention the aeration containment element (23) can further contain a juice distribution surface (24). Juice (1) can be distributed to the juice distribution surface (24) to provide a further increased interface surface area (4). Again, juice can be discharged into the top region of the aeration containment element (23) spread over the juice distribution surface (24) and can be exposed to the mixture of gases (3) passed through the aeration containment element (23). Again, the mixture of gases (3) can be passed through the aeration containment element (23) counter current to the general direction that the juice (1) flows on the juice distribution surface (24) to increase the efficiency of transfer of dissolved material (5) in the juice (1) to the mixture of gases (3).

As to each of these embodiments of the invention utilizing the aeration containment element (23), the juice (1) can be collected and cycled through the aeration containment element (23) as many times as may be desired.

Figure 4:
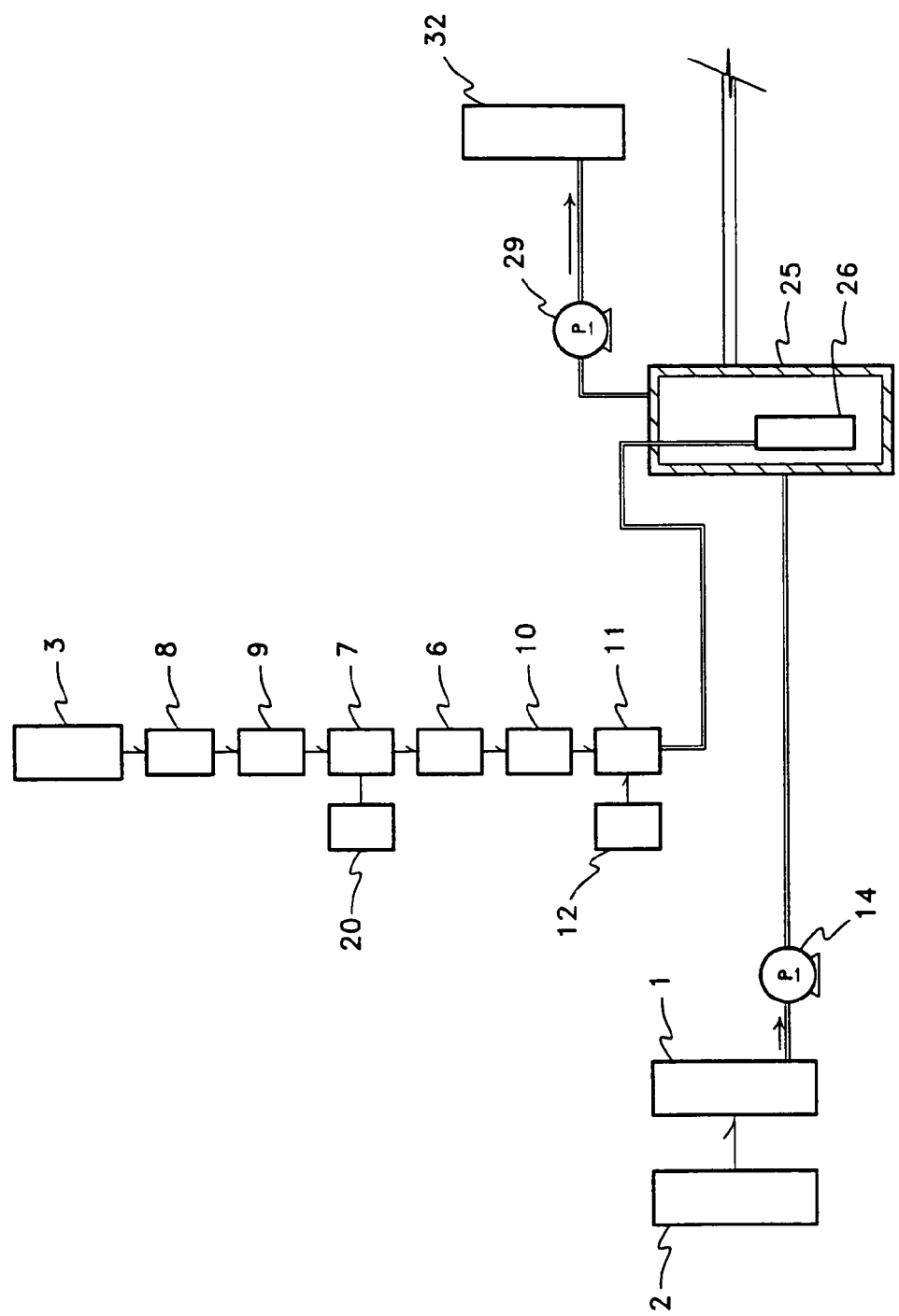
FIG. 4 shows a particular embodiment of the invention to produce juice or process liquid having a reduced concentration of certain components or materials therein.

Now referring primarily to FIG. 4, in other embodiments of the invention, juice (1) can be transferred to a juice containment element (25), and the mixture of gases (3) can be introduced into the juice (1) by sparging the juice (26). The pressure and volume of the mixture of gases (3) can be adjusted relative to the volume of juice (1) and the size of the juice containment element (25). The juice containment element can further be combined with the aeration containment element (23) described above.

A general discussion of gas absorption provided by Chemical Engineer's Handbook, Perry, ed., McGraw-Hill Book Company, pg. 668 et seq. (1950) is hereby incorporated by reference to the extent necessary for an understanding of the general principals of gas absorption.

It can be appreciated that a variety of conventional conduits, valves, or other devices, for example, pressure gauges, can be provided to generate relevant information concerning the transfer of the juice (1) to the gas injector (13), aeration containment element (23), or juice containment element (25), the amount and pressure of the mixture of gases (3) injected, sprayed, or sparged, the amount of dissolved material (5) in the juice (1), or the like.

Again referring primarily to FIG. 2, the invention can further include a gas separator (27) to release the mixture of gases (3) which contain dissolved material (5) transferred from the juice (1). In certain embodiments of the invention, where an aeration containment element (23) is utilized, as described above, the gas separator (27) can comprise an aperture in the aeration containment element allowing the mixture of gases passed through the aeration containment element to be discharged to atmosphere. In those embodiments of the invention where the gas injector (13) comprises a sparger (26), the gas separator (27) can be an aperture allowing the mixture of gases (3) containing dissolved material to be discharged to atmosphere. In those embodiments of the invention where the gas injector (13) introduces the mixture of gases (3) into a stream of juice (1) to generate a mixed stream of juice (19), whether continuous, pulsatile, or intermittent, transferred in a conduit closed from atmosphere, the gas separator (27) can comprise a portion of the conduit that further provides an interior volume fluidically coupled to atmosphere. Specifically, the gas separator (27) fluidically coupled to atmosphere can comprise a portion of the conduit configured to, or having restriction means to, adjust the time that the mixed stream (19) is responsive to atmosphere.

Specifically, one configuration of the gas separator (27) can be an increase in the internal volume of the conduit to spread the mixed stream (19) over the interior surface of the conduit to increase the residence time that, or to increase the surface area when, the juice is fluidically coupled to atmosphere, or both. In certain embodiments of the gas separator (27), the juice can be spread over a surface area sufficiently large to allow the mixture of gases (3) within the juice (1) to substantially equilibrate with atmospheric partial pressures prior to transfer of the juice from the gas separator (27). The interior surfaces of the gas separator (27) can be further configured to provide extensions, corrugates, grooves, or the like, to further mix or agitate the juice (1) within the gas separator (27) to increase the rate at which the mixture of gases (3) can be transferred from the juice (1) to atmosphere.

A gas flow of the mixture of gases (28) transferred from the juice (1) to atmosphere can be generated by coupling a source of reduced pressure (29) to the gas separator (27). Reduced pressure involves generating partial pressures of gases at the increased surface area (4) of the juice (1) that are lower than the partial pressures of the dissolved materials (5) transferred to the mixture of gases (3). As can be understood, the source of reduced pressure (29) can be atmosphere when the partial pressures of the mixture of gases containing dissolved materials (5) removed from the juice exceeds atmospheric pressure. With respect to some embodiments of the invention, as described above, a source of reduced pressure (29) can be generated by increasing the interior volume of the conduit in which the mixed stream (19) flows. The source of reduced pressure (29) can also be generated by a vacuum pump, a venturi, or other device fluidically coupled to the gas separator (27). The partial pressure of gases generated at the increased surface area (4) of the juice can then be adjusted as desired (e.g. below atmospheric pressure) to increase the transfer rate of the mixture of gases (3) containing dissolved material (5) from the mixed stream (19) of juice.

As to some embodiments, the gas separator can further include a relief valve (30) or further include a signal generator (31), coupled to the source of reduced pressure (29) that can be responsive to accumulation of, or partial pressures of, gases within the gas separator (27), or responsive to a reduction in dissolved materials in the juice (total dissolved material, certain dissolved materials, concentration of dissolved materials, or concentration of certain dissolved materials), a reduction in acidity of the juice, alkalinity of the juice, an increase in pH of the juice, or other measure, that indicates sufficient dissolved material has been transferred from the juice (1).

The invention can further include storage or conveyance of the mixture of gases (32) containing dissolved materials removed from the juice that avoids discharging all or a portion to atmosphere. In certain embodiments of the invention the mixture of gases containing dissolved materials from the juice (e.g. containing carbon dioxide) can be utilized for carbonation steps as described above, as but one example.

The invention can also include the addition of antifoaming agents (33) to the juice (1). Juice contains a large amount of material that can be surface active or that can alter the surface tension of water. As such, air inclusion within the juice, or dissolved gases transferred from the juice to atmosphere, can result in foam. There are many kinds of antifoaming agents that can be used to reduce the amount of foam. Including, but not limited to, fatty acids, oils, or the like. To accomplish injection of the mixture of gases (3) into juice (1) or to transfer the mixture of gases (3) containing at least some dissolved material (5), as described above, can further require the step of adding an amount of antifoaming agent simultaneous with, or at about the time the juice is exposed to or injected with, the desired mixture of gases (3).

Once the desired amount of dissolved material, volatile material, dissolved gases, aqueous acids, or the like, have been transferred from the juice (1) the resulting juice product can be transported to existing sugar process facilities for further clarification or purification. Alternately, the various embodiments of the invention can be incorporated into sugar process facilities to produce juice having reduced dissolved material in situ.

Figure 5:
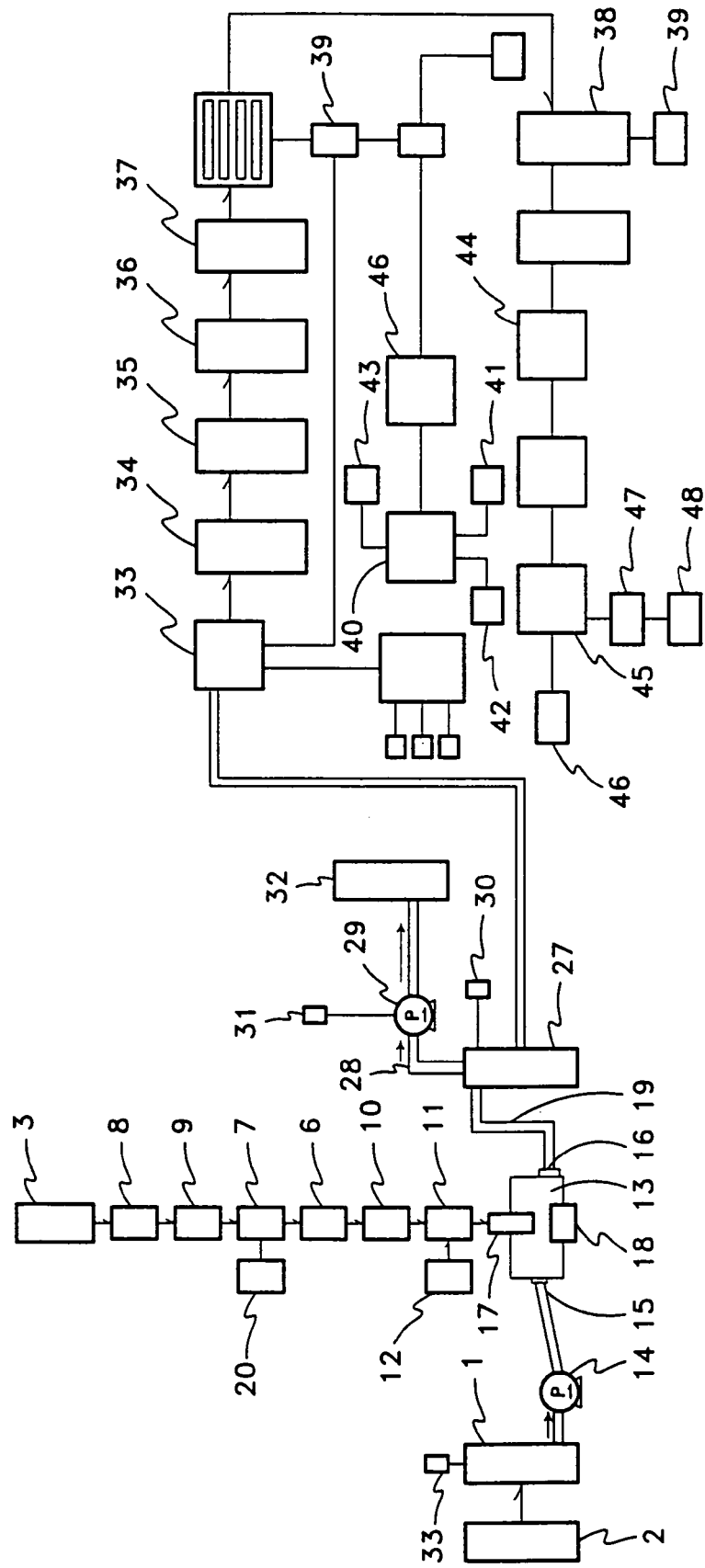
FIG. 5 shows a particular embodiment of the invention to produce juice or process liquid having a reduced concentration of certain components or materials therein that can further include the use of liming and carbonation to further clarify or purify the juice or process liquid prior to reduction of water content to produce syrup, or prior to crystallization of sugar.

Now referring to FIG. 5, with respect to sugar process systems which utilize base, such as calcium oxide or calcium hydroxide, to raise pH for the purpose of initially reaching the iso-electric point of the various materials dissolved in the juice (1), or as part of conventional method of preliming juice (33) either separate from or in conjunction with further steps such as cold liming (34), main liming (35) or intermediate liming (36) again separate from or in conjunction with a first carbonation step (37) or second carbonation step (38) that can result in a precipitate of calcium carbonate (39) to trap at least a portion of the non-sucrose substances from the juice (1) so that the resulting clarified or purified juice can be filtered (44) prior to evaporation (45) of the desired amount of water, the method and apparatus involving the invention can be utilized to produce a juice product having reduced dissolved material or reduced dissolved gases consistent for introduction into one, or more, or all of these conventional steps, or conventional steps modified to the extent to benefit from the characteristics of the juice treated in accordance with the invention.

As can be appreciated the invention can be used to reduce dissolved materials within the juice prior to any addition of base. Because the invention can substantially increase the pH or reduce the acidity of the juice, the amount of base used in conventional preliming or main liming steps can be reduced. Alternately, in those process systems in which the underflow in the process system, such as spent lime, is used to neutralize some portion of the acid in the juice, or used to reduce foaming, the under flow can be introduced either before or after utilizing the invention.

Specifically, a method of purifying juice utilizing the invention can comprise obtaining juice (1) from plant material (2) where the juice as above described contains sucrose, non-sucrose substances, and water. Utilizing the invention in the various embodiments shown or described to either raise the pH or lower acidity of the juice, or remove other volatile or semi-volatile components, prior to preliming (33) the juice. Cold main liming (34) the juice (1) or hot main liming (35), or both, can be utilized in conjunction with carbonating (37)(38). Where calcium oxide or calcium hydroxide has been employed as the base (46) in the preliming (33) or main liming (34)(35) steps, a carbonation step (37) precipitating calcium carbonate (39) can result in trapping at least a portion of the non-sucrose substances in the juice (1). These precipitates (39) allow removal of the trapped non-sucrose substances by separation of the juice (1) from the precipitates (39). In some embodiments of the invention, an intermediate liming (36) step in conjunction with an additional carbonation (38) step can be performed. Again precipitating calcium carbonate (39) can allow removal of trapped non-sucrose substances. Removing calcium carbonate precipitates (39) can yield a juice (1) that after by removing water content (45) to the desired amount can yield desired syrups (46). Alternately, crystallizing (47) the sucrose content within the juice can yield sugar products (48).

Figure 6:
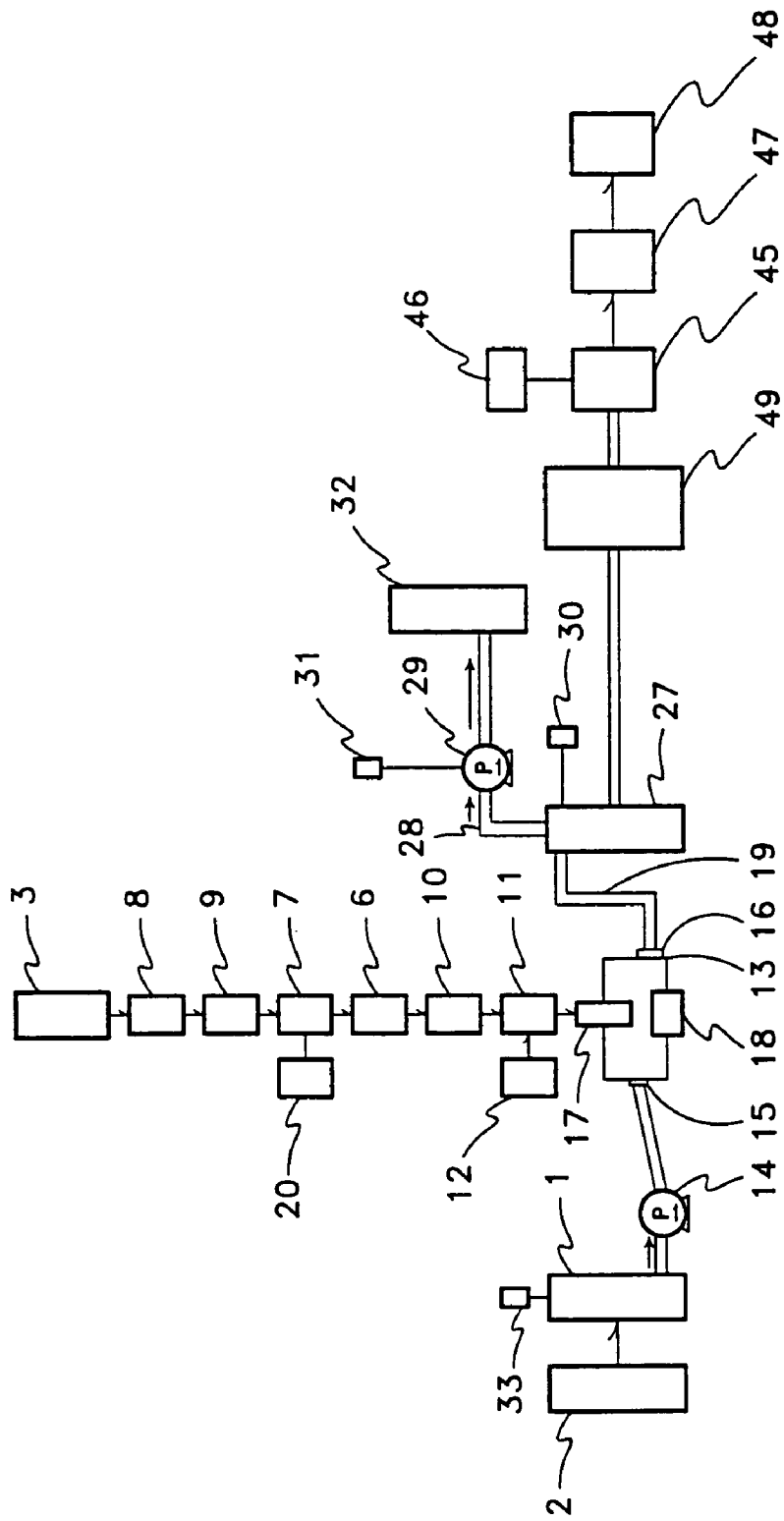
FIG. 6 shows a particular embodiment of the invention to produce juice or process liquid a reduced concentration of certain components or materials therein that can further include the use ion exchange to further clarify or purify the juice prior to reduction of water content to produce syrup, or prior to crystallization of sugar.

Now referring primarily to FIG. 6, with respect to sugar process systems that utilize ion exchange (49) to replace conventional calcium carbonate purification steps in the sugar process system as described above, it can be understood from U.S. Pat. Nos. 3,785,863; 4,331,483; or 4,140,541, each hereby incorporated by reference, that base, such as lime can be used to pretreat juice so that it may more readily be filtered prior to ion exchange steps (49), to regenerate ion exchange material to generate the calcium form so that the polar load of the juice is exchanged for calcium, or to reduce acidity of the juice after ion exchange processes.

In these types of processes, the invention can be used to reduce the amount of dissolved materials, or dissolved gases, or reduce acidity of the juice prior to or in conjunction with pretreatment of the juice, or to reduce the polar load of the juice prior to ion exchange, or to reduce the acidity of the juice after the ion exchange steps. Each of these can be accomplished by processing the juice in accordance with the invention.

Figure 7:
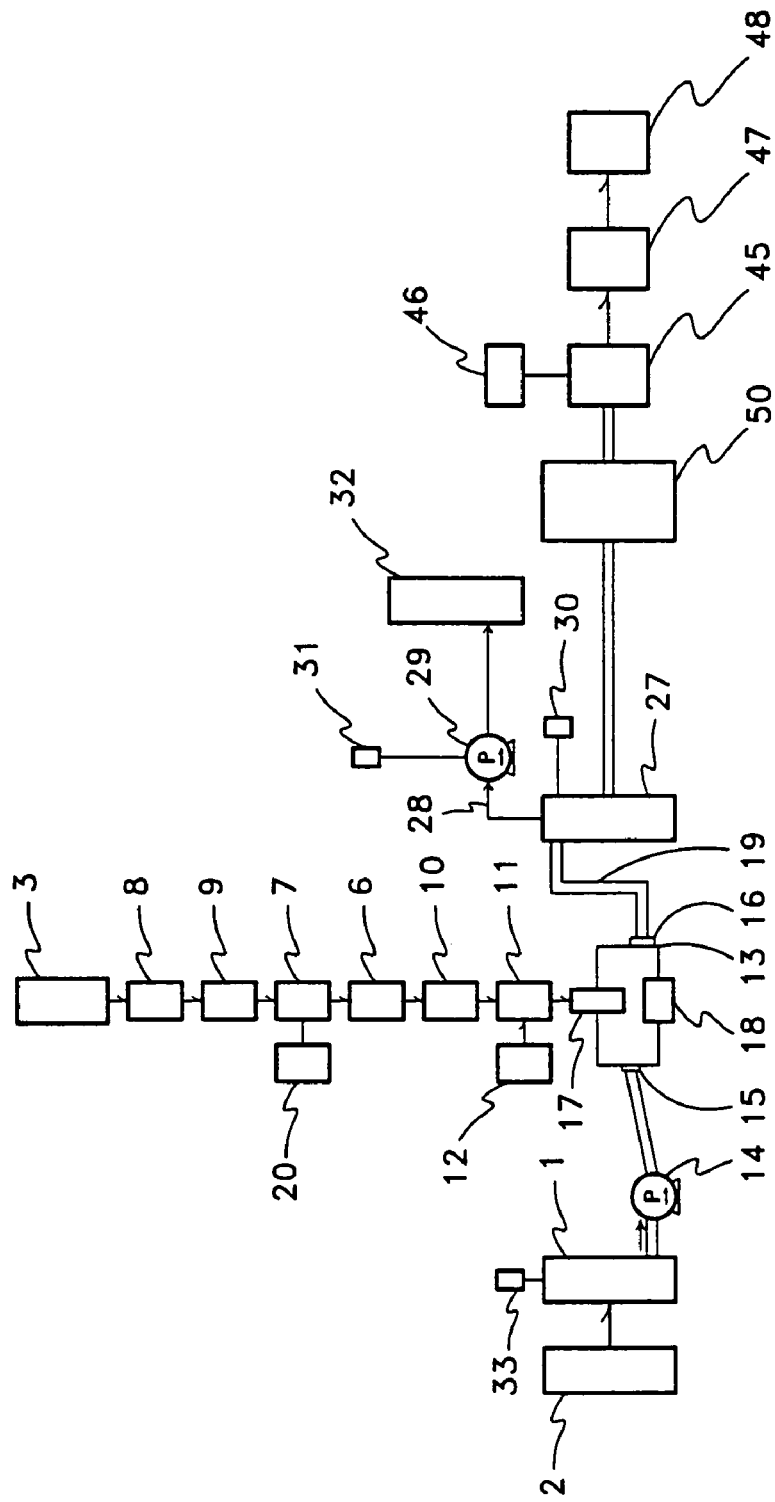
FIG. 7 shows a particular embodiment of the invention to produce juice or process liquid having a reduced concentration of certain components or materials therein that can further include filtration steps, such as ultrafilration, to further clarify or purify the juice prior to reduction of water content to produce syrup, or prior to crystallization of sugar.

Now referring primarily to FIG. 7, with respect to sugar process systems that utilize filtration or ultrafiltration to replace conventional calcium carbonate purification steps in the sugar process system as described above, it can be understood from U.S. Pat. No. 4,432,806, hereby incorporated by reference, that base, such as lime can be used to pretreat juice so that it may more readily be filtered (50).

In these types of processes, the invention can be used to reduce the amount of dissolved materials, or dissolved gases, or reduce acidity of the juice prior to or in conjunction with pretreatment of the juice with base to allow non-sucrose substances to reach their isoelectric points and aggregate, or to otherwise generate solid particulates that can be filtered from the remaining liquid portion of the juice. Each of these can be accomplished by processing the juice in accordance with the invention.

Figure 8:
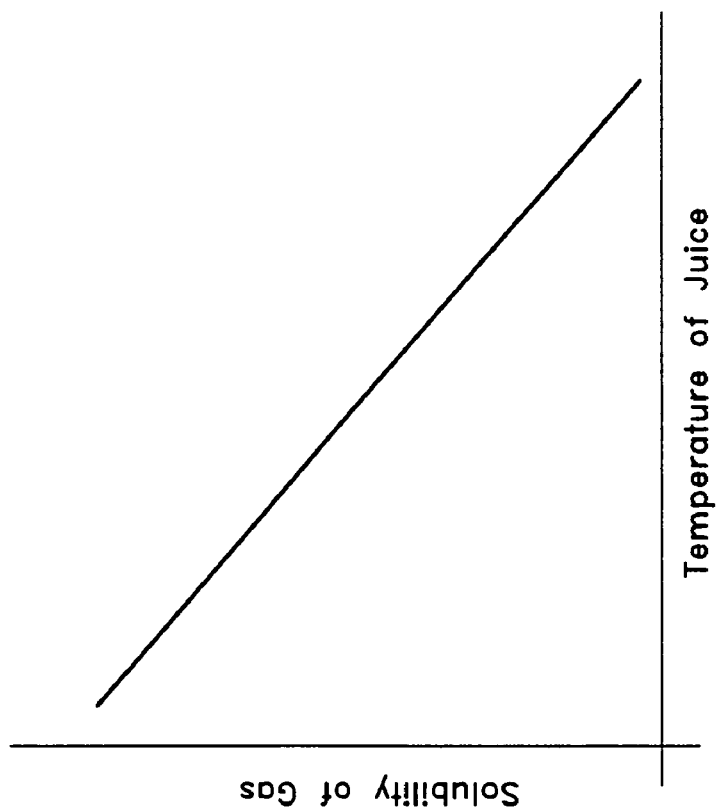
FIG. 8 is a graph showing that as the temperature of juice(s), diffusion juice(s), or process liquid(s) that contain material(s) or component(s) diffused, extracted, or otherwise removed from plant material(s) increases the solubility or concentration of gas(es), volatile material(s), or certain pH reducing materials decreases.

Now referring primarily to FIG. 8, the invention can include apparatus for processing or methods of processing liquids containing sucrose, or diffusion juice(s), which take advantage of the lower solubility of pH reducing materials in such liquids. As sucrose containing liquids are heated the solubility of certain materials including gases, such as $CO_2$ and $SO_2$ decreases. As such, the transfer of these materials from such liquids can be initiated or increased at the interface between such liquid and a mixture of partial pressures of gases, even when the material could not be transferred, or could not be further transferred to such partial pressure of gases at a lower liquid temperature.

Figure 9:
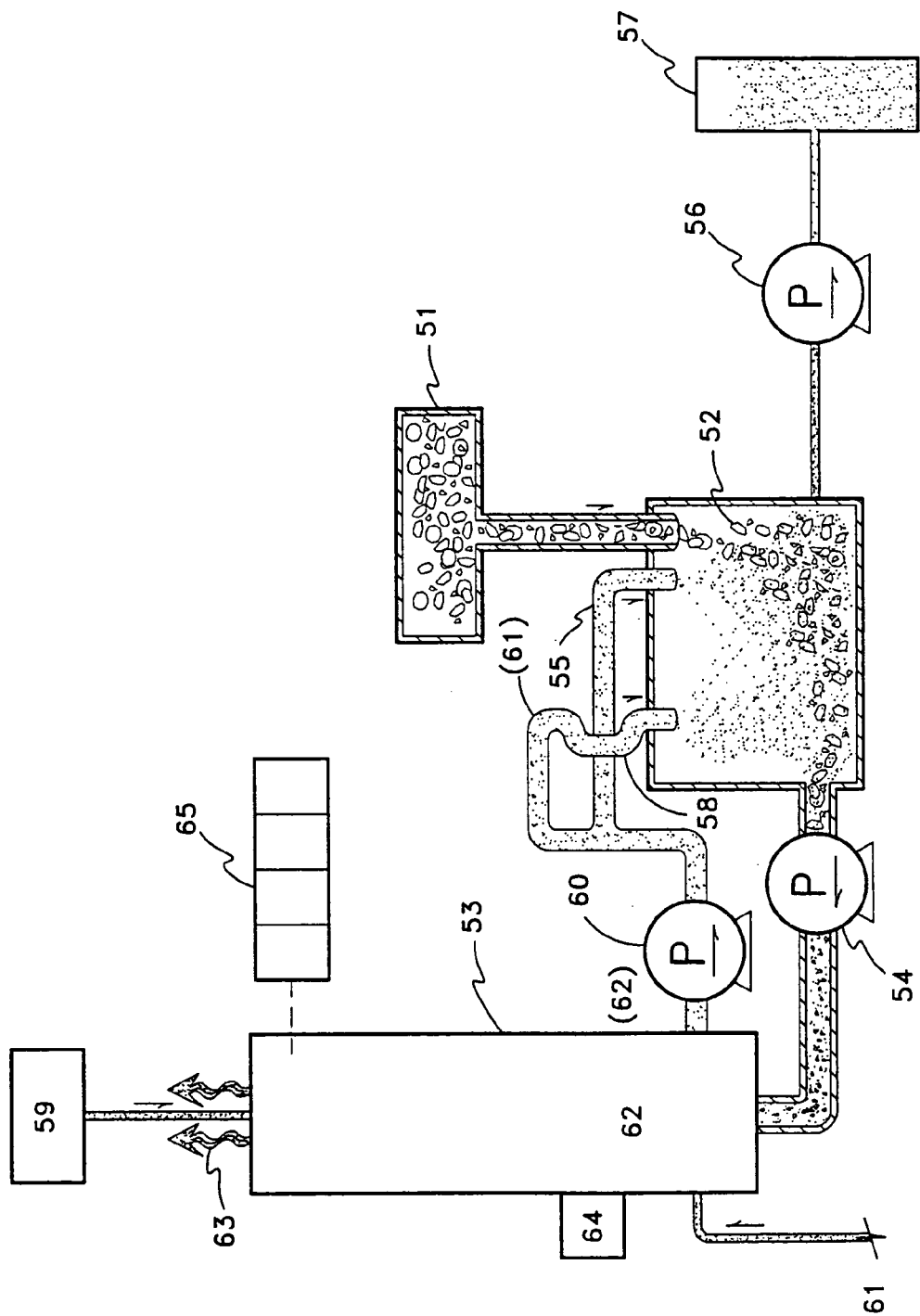
FIG. 9 shows a particular embodiment of the invention to process sugar beet cossettes in a manner that reduces the concentration of pH reducing materials in process liquids compared to conventional sugar beet process systems.

Now referring primarily to FIG. 9, a particular embodiment of the invention is shown. Sugar beet cossettes (51) are introduced into mixer (52) typically by conveyor belt but other conveyance to the mixer can be used, or introduced directly into cossette diffuser (53) using a pump (54). In particular embodiments of the invention in which sugar beet cossettes are introduced into mixer (52), the sugar beet cossettes (51) can first be exposed to a portion of the effluent (55) from the cossette diffuser (53) before the effluent is delivered by pump pressure (56) or other means to pre-liming steps (57).

The sugar beet cossettes (51) can then be exposed to another portion of the effluent from the diffuser (58) prior to being transferred by pump pressure (54) or other means to the diffuser (53). In the diffuser the sugar beet cosettes are treated with heated water (59) (typically between 50° C. and 80° C.), sometimes in a counter current fashion, to remove or transfer materials from the sugar beet cossettes (51) to the heated water (59) as described in detail above. The heated water (59) now containing the materials diffused from the sugar beet cossettes (51) (sometimes referred to as "diffusion juice") is collected and transferred by pump (60) to the mixer (52) as a single or multiple effluent streams (55)(58).

In the diffuser step (53), the temperature of the diffusion juice can be quite high (between about 50° C. and 80° C.) relative to the temperature of the diffusion juice when it enters pre-liming steps (between about 20° C. and 30° C.). As such in the diffuser (53) diffusion juice can have a lower solubility to pH reducing materials than during the pre-liming steps. Due to the increased temperature of diffusion juices in the diffuser pH reducing materials contained in diffusion juice can move toward an equilibrium with atmospheric gases, or a selected or presented partial pressures of gases, that can significantly reduce pH reducing materials contained in the diffusion juice, such as $CO_2$, or $SO_2$ (61) that has been added to the diffuser or to the effluent stream (58).

Importantly, it has not been known that during diffusion steps that the transfer equilibrium between the concentration of pH reducing materials such as $CO_2$ or $SO_2$ in the diffusion juice within the diffuser (53) and atmospheric partial pressures, or other partial pressures of gases, could be monitored, assessed, and manipulated to transfer or remove a greater portion of these materials from the diffusion juice resulting in a increased pH or in a diffusion juice that can require less lime addition during subsequent preliming steps.

The monitoring, assessment, and manipulation of the diffusion juice to take advantage of the higher temperature (lower solubility of pH reducing material) of the diffusion juice can occur at any step between the diffuser (53) and the reduction in temperature of the juice prior to the pre-liming step (57). As such there are numerous embodiments of this high temperature version of the invention in a variety of configurations which manifest the generic high temperature version of the invention which is to present a mixture of gases having partial pressures to a diffusion juice interface surface area that allows transfer of a greater amount, or the desired amount of pH reducing materials (such as CO2, SO2, other gases, acids, volatile organic compounds, or the like depending on the mixture of gases provided) from the diffusion juice to the mixture of gases presented.

Importantly, while diffuser technology has been used for decades, it has not been known until the instant invention that the diffuser (53) itself can prevent or reduce transfer of pH reducing materials such as CO2 and SO2 from diffusion juice(s) resulting in concentrations of pH reducing materials in conventionally treated diffusion juices that can be higher than in diffusion juice treated in accordance with the invention. In fact, because this has gone undetected for such a long duration of time, later model diffusers produce diffusion juices that can have a pH lower than similar diffusion juice obtained from diffusers designed and built at an earlier time.

Certain embodiments of the invention comprise an exchange rate of atmospheric partial pressures or maintains a partial pressure of gases (62) within the diffuser that establishes additional transfer of pH reducing materials such as CO2 or SO2 or the desired level of transfer of such pH reducing materials from heated diffusion juices (63) within the diffuser. In some embodiments of the invention, the diffuser (53) can be modified to include additional fluidic coupling with the atmosphere to allow increased exchange of atmospheric partial pressures at the surface of the heated diffusion juice. In other embodiments of the invention a blower (64) can be installed where the configuration of the diffuser cannot be modified to increase exchange of atmospheric pressures within the diffuser (53).

Other embodiments of the invention, provides assessment element(s)(65) which monitors the transfer of CO2 or SO2 or both from the diffusion juice or the pH of the juice to provide information from which the exchange rate of atmospheric partial pressures at the diffusion juice interface can be controlled.

Figure 10:
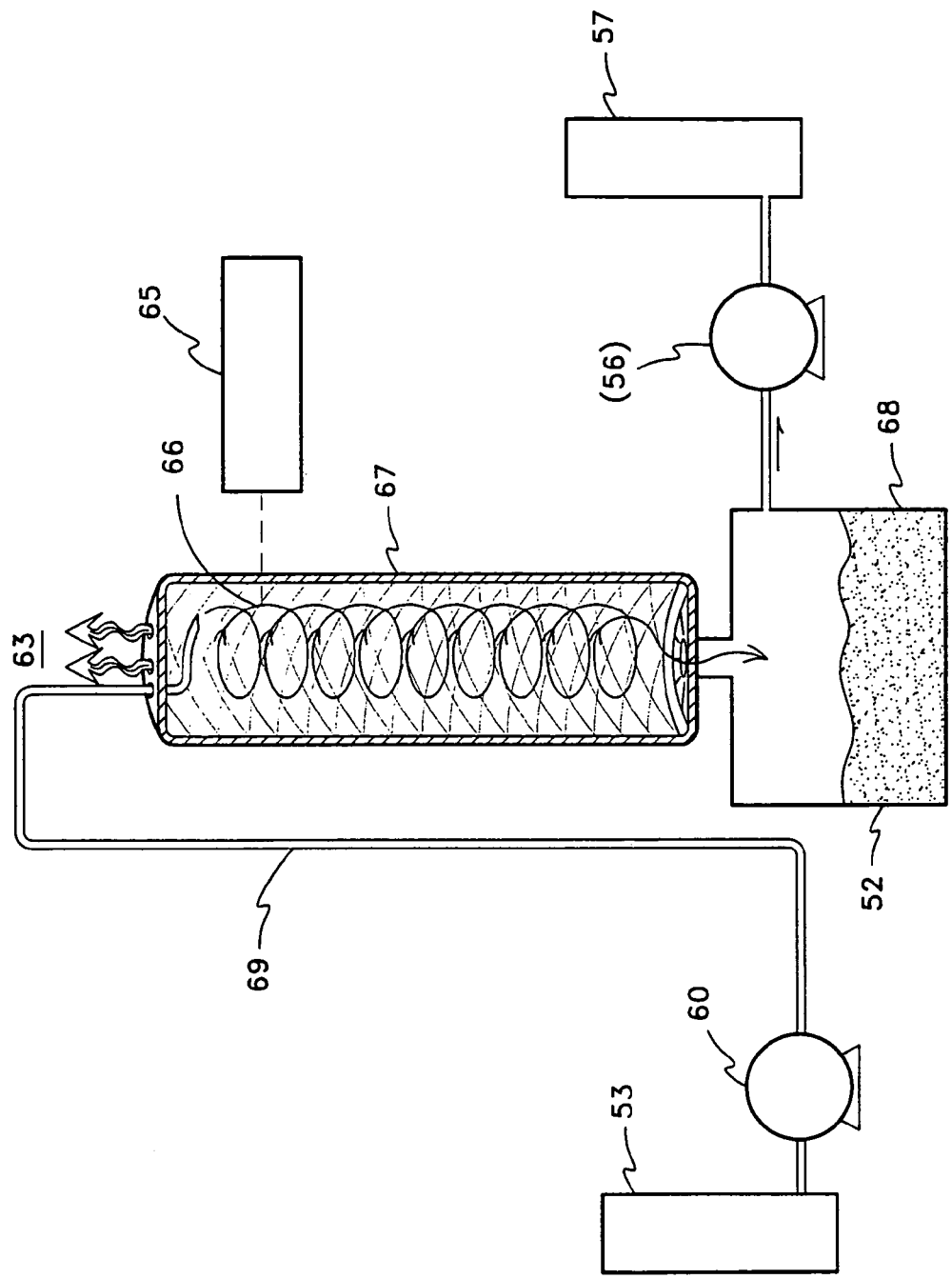
FIG. 10 shows a particular embodiment of the invention to process sugar beet cossettes in a manner that reduces the concentration of pH reducing materials in process liquids compared to conventional sugar beet process systems.

Now referring primarily to FIG. 10, other embodiments of the high temperature invention comprises heated diffusion juice (66) transferred by means of a pump (60) or other liquid conveyance to a containment element (67) that increases the surface area of the heated diffusion juice (66) to provide a greater reduction in concentration of pH reducing materials (or the desired level of pH reducing materials, such as CO2 or SO2) or to generate a more rapid transfer of the pH reducing materials from the heated diffusion juice. The increased surface area (or the desired surface area which could also be adjustably variable) of the heated diffusion juice (66) can be obtained in various ways as described above by injection of desired partial pressures of gases to strip the diffusion juice, sprayed into a containment element, or delivered over a increased area substrate.

Certain embodiments of the invention can include container (67) having a substantially open top and can further provide a substantially open bottom (which for convenience can have a reduced size opening to transfer treated diffusion juice to the mixer, a settling tank (68), or pump (56)(54), or other transfer means. The heated juice (66) from the diffuser can be introduced near the top of the container (67) such that the heated juice (66) has a substantially increased surface area with respect to atmospheric partial pressures within the container. As shown in FIG. 10, one embodiment of the invention introduces the heated juice near the top of the container (67) such that the heated juice spreads over the interior walls and can have sufficient force to spiral down at least a portion of the height of the interior surface to increase the residence time in the container (67).

As to some embodiments of the invention, the manner of introduction of the heated juice into the container (67) can be the means of increasing the surface area of the heated juice (66) while the container (67) serves only to contain and collect the treated diffusion juice. In these embodiments of the invention the configuration of the fluid stream of heated juice can be modified to create additional surface area fluidicly coupled to atmospheric or desired partial pressures of gases by agitation, pulsation, division into multiple streams, spraying, droplet formation, or otherwise.

Alternate embodiments of the invention can utilize the configuration of the container (67) to optimize the increase in surface area of the heated diffusion juice (66). For example, the container can have a circular or conical configuration or even a variably adjustable configuration that controllably increases or decreases the surface area of the heated juice introduced onto the container (67) surface and the residence time on the surfaces of the container. As to some embodiments of the invention the container can be an increase in the diameter of the conduit (69) transferring the juice providing fluidic coupling with atmospheric partial pressures or the desired partial pressures of gases can be injected into the conduit to strip the heated diffusion juice of pH reducing materials or undesirable strippable components.

In certain embodiments of the invention, the partial pressures of gases to which the surface area of the heated juice is exposed can be controlled by evacuation or desired exchange of selected mixtures of gases to maintain a continuously lower concentration of desired partial pressures of gases to increase transfer of the desired gases or materials from the heated diffusion juice, including gas stripping as described above.

These examples of specific embodiments of the invention are specifically intended to be illustrative of the broader generic concept of utilizing the lowered solubility of heated juice to certain materials, gases, volatile compounds, acids, or the like to affirmatively monitor, assess, or control the concentration of these materials through one of or a combination of controlling the partial pressures of gases presented to the surface of heated diffusion juices or increasing the surface area of the heated juice exposed to a desired partial pressure of gases prior to pre-liming steps. The advantages of the invention are to be understood even in the context of small additions of base such as lime to control foaming of juice(s) during processing prior to the pre-liming step.

Figure 11:
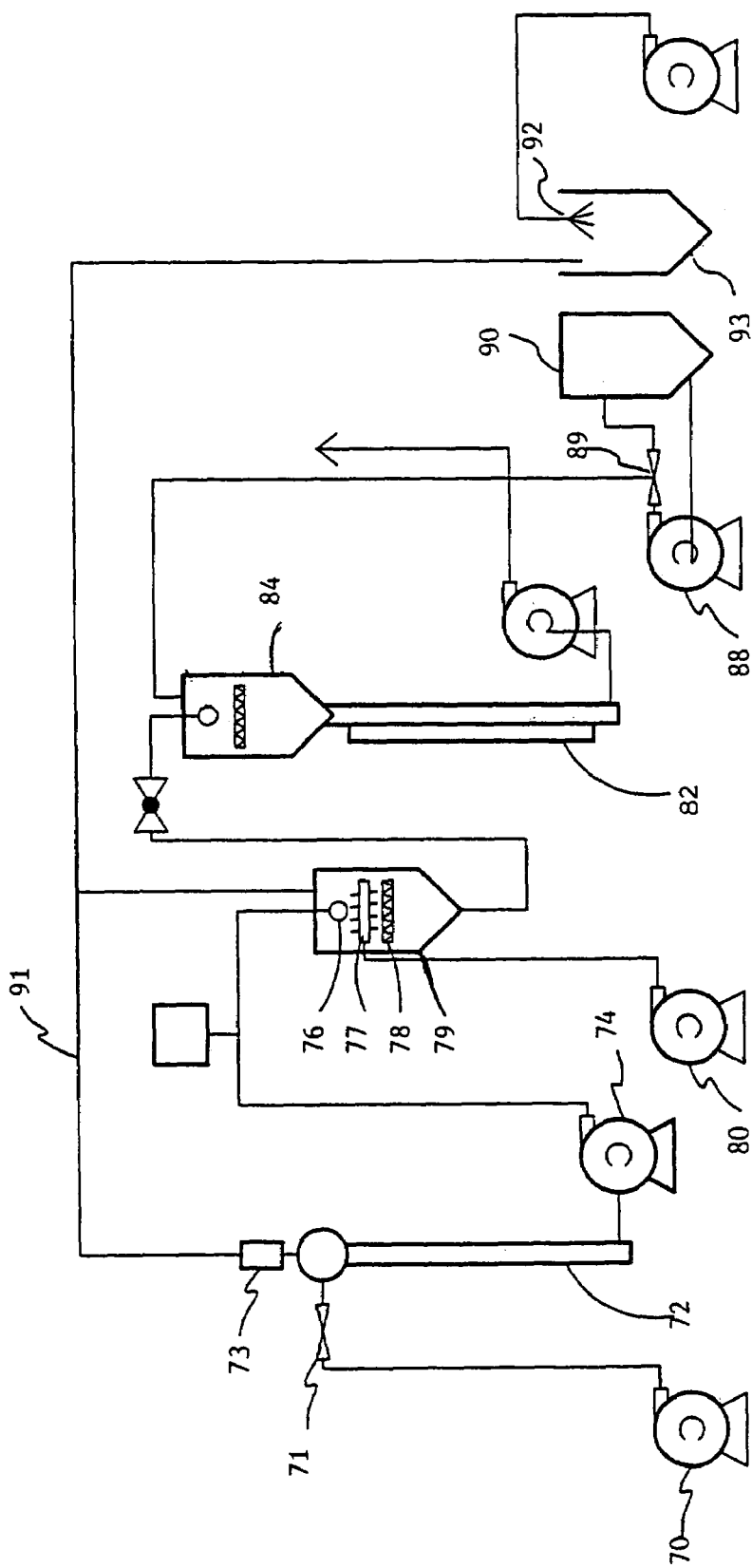
FIG. 11 shows a particular embodiment of the invention to process juice or process liquids obtained from plant material.

Now referring primarily to FIG. 11, a further embodiment of the invention can comprise a pump (70) or other liquid transfer element that achieves adequate process liquid pressure (between about 20 pounds per square inch and about 25 pounds per square inch) at the an injection port of an gas injector (71). As described above, the process liquid may be heated to between about 50° C. to about 80° C. to decrease solubility of gases in the process liquid, such as $CO_2$, $SO_2$, volatile organic compounds, or volatile inorganic compounds, or otherwise described above, in the process liquid. After air or other partial pressures of gases as desired, are injected into the process liquid at the injection port (71), the process liquid can be transferred to a gas-liquid separator (72) which in some embodiments of the invention can be a centrifugal gas-liquid separator that can achieve forces of about four times gravity. The gas-liquid separator (72) allows partial pressures of gases injected into the process liquid to transfer dissolved gases, volatile organic compounds, or volatile inorganic compounds to atmosphere to lower the concentration of these materials in the process liquid. In some embodiments of the invention, the gas-liquid separator can be a container that contains the process liquid in a manner that increases the atmosphere-process liquid interface allowing the transfer of materials from the process liquid to the atmosphere in a shorter duration of time. When a centrifugal gas-liquid separator is used, centrifugal forces applied to the process liquid can spread the process liquid over the inside surface of a cylindrical container (although other configurations can be used as well) with forces in some cylindrical embodiments of the invention of about four times gravity. Spreading the process liquid over the inside surface of the cylindrical container of the centrifugal gas-liquid separator increases the area of the atmosphere (or other partial pressures of gases)-process liquid interface by maintaining a column of gases at the center of the cylindrical to which gases in the process liquid can be transferred to. A gas relief system (73) allows partial pressures of gases transferred from the process liquid to atmosphere. In some embodiments of the invention, the process liquid from the gas-process liquid separator (72) can enter the preliming step of convention sugar process systems, or enter other processing steps as described above.

As to other embodiments of the invention, pump (74) or other process liquid transfer element transfers process liquid to a liquid dispersion element (76), such as a nozzle, to distribute the process liquid in a manner that increases the atmosphere (or other partial pressure of gases)-process liquid surface area. In some embodiments the liquid dispersion element (76) can create droplets or a spray. A gas distribution manifold (77) or other gas distribution element moves air or other partial pressure of gases through the dispersion of process liquid to further allow gas partitioning between dissolved gases, volatile organic compounds, or volatile acids, or the like, in the process liquid and the partial pressure gases introduced by the gas distribution manifold. In some cases, the flow of such partial pressure of gases introduced by the gas distribution manifold (77) can be counter current to the direction of the dispersed process liquid from the liquid dispersion element (76) to make the process of gas partitioning or gas stripping more efficient. A foam dispersion element (78) can be further included to knock down foam generated by the liquid during the gas partitioning or gas stripping process. A mesh or screen having apertures of a suitable size can be used. The liquid dispersion element (76), the gas distribution manifold (77) and the foam dispersion element (78) can be located inside a containment element (79) or gas partition column. Gas flow volume to the gas distribution manifold (77) can be established with a gas transfer element (80). The gas flow volume can be regulated in amount based upon analysis of the conditions within the containment element (79) or the chemical conditions within the process liquid, separately or in combination. In some embodiments of the invention the process liquid can enter the pre-liming step of convention sugar process systems, or enter other processing steps as described above.

Certain embodiments of the invention can further include a vacuum chamber (84) into which process liquid can be transferred. The pressure within the vacuum chamber (84) can be adjusted or regulated to transfer the desired amount of volatile materials from the volume of process liquid passed through the vacuum chamber (84) (or achieve the desired pH). The vacuum within the chamber can be generated by a vacuum pump, or with respect to some embodiments of the invention movement of liquid through an eductor system (88) (89)(90). The amount of process liquid entering the vacuum chamber (84) can also be regulated by a liquid control valve (81) and can be dispersed through a second liquid dispersion element (82) to increase the process liquid-gas interface area. The process liquid can then be transferred from the vacuum chamber (84) to the preliming step of convention sugar process systems, or enter other processing steps as described above.

The invention can further comprise a vent system (91) from various components (72)(79)(84)(90) to transfer overflow process liquid or process liquid foam to a vent collection container (93) into which an anti-foam agent can be added through an anti-foam agent dispersion element (92). The process liquid collected in the vent collection container (93) can then be transferred from the vacuum chamber (84) to the pre-liming step of convention sugar process systems, or enter other processing steps as described above.

EXAMPLE 1

Juice was obtained by conventional tower diffusion of sugar beet cossettes. A control group and an experimental group each consisting of six substantially identical 500 mL aliquots of the diffusion juice were generated. Each aliquot within the control group and the experimental group was analyzed to ascertain the pH value. As to each aliquot of the diffusion juice in the control group the pH value was about 6.3. Each aliquot within the control group without any further treatment was titrated to an 11.2 pH endpoint with a solution of 50% wt./vol. caustic soda. Each aliquot within the experimental group was treated in accordance with the invention after which the pH of each aliquot was ascertained and each experimental aliquot titrated in substantially identical fashion to the control group to an 11.2 pH endpoint with a solution of 50% wt./vol. caustic soda.

The results are set out in Table 1 below. As can be understood from the table each aliquot of juice prior to any treatment had a pH of about 6.3. The experimental group after treatment in accordance with the invention had increased pH values without the addition of any base, and required a reduced amount of caustic soda to achieve the 11.2 pH endpoint as compared to the control group.

TABLE 1

| | Untreated Juice pH | mL Caustic Soda | Treated Juice pH | mL Caustic Soda | % reduction Caustic Soda |
| --- | --- | --- | --- | --- | --- |
| 1 | 6.3 | 1.8 | 6.5 | 1.5 | 16.6 |
| 2 | 6.3 | 1.8 | 6.6 | 1.4 | 22.2 |
| 3 | 6.3 | 1.8 | 6.6 | 1.4 | 22.2 |
| 4 | 6.3 | 1.9 | 6.6 | 1.6 | 15.8 |
| 5 | 6.3 | 1.9 | 6.5 | 1.5 | 21.0 |
| 6 | 6.3 | 1.9 | 6.5 | 1.6 | 15.8 |

The reduction in the amount of caustic soda to reach the 11.2 pH endpoint for the aliquots of juice in the experimental group treated in accordance with the invention as compared to the aliquots of juice in the untreated control group was between about 15.8% and about 22.2%.

EXAMPLE 2

Juice was obtained by conventional tower diffusion of sugar beet cossettes. A control group and an experimental group each consisting of five substantially identical 500 mL aliquots of the diffusion juice were generated. Each aliquot within the control group and the experimental group was analyzed to ascertain the pH value. As to each aliquot of the diffusion juice in the control group the pH value was about 6.1. Each aliquot within the control group without any further treatment was titrated to an 11.2 pH endpoint with a solution of 30 brixs milk of lime. Each aliquot within the experimental group was treated in accordance with the invention after which the pH of each aliquot was ascertained and each experimental aliquot titrated in substantially identical fashion to the control group to an 11.2 pH endpoint with a solution of 30 brixs milk of lime.

The results are set out in Table 2 below. As can be understood from the table each aliquot of juice prior to any treatment had a pH of about 6.1. The experimental group after treatment in accordance with the invention had increased pH values without the addition of any base, and required a reduced amount of milk of lime to achieve the 11.2 pH endpoint as compared to the control group.

TABLE 2

| | Untreated Juice pH | mL Milk of Lime | Treated Juice pH | mL Milk of Lime | % reduction Milk of Lime |
| --- | --- | --- | --- | --- | --- |
| 1 | 6.1 | 4.6 | 6.5 | 3.3 | 28.3 |
| 2 | 6.1 | 4.4 | 6.6 | 3.2 | 27.3 |
| 3 | 6.1 | 4.7 | 6.6 | 3.5 | 25.5 |
| 4 | 6.1 | 4.4 | 6.6 | 3.3 | 25.0 |
| 5 | 6.1 | 4.5 | 6.6 | 3.3 | 26.7 |

The reduction in the amount of milk of lime to reach the 11.2 pH endpoint for the aliquots of juice in the experimental group treated in accordance with the invention as compared to the aliquots of juice in the untreated control group was between about 25.0% and about 28.3%.

Also, the data set out in Table 1 and Table 2 provides a comparison of two different types of diffusion apparatus and diffusion methods. Importantly, the data shows that different diffusers or different diffusion methods can generate diffusion juice having significantly different pH values even though pH values attributed to each type of diffusion technology can be substantially internally consistent. See for example the initial pH value of the untreated diffusion juice in Table 1 which shows a pH value of 6.3 as compared to the untreated diffusion juice in Table 2 which a pH value of 6.1.

While there may be different types of diffusion apparatus and different diffusion methods, there is a lack of recognition within the ordinary skill in the art that pH can be altered or reduced during diffusion of sugar beet material or other types of plant material, or a lack of recognition that different diffusion apparatus or different methods yield juice or liquids having different pH values, or a lack of recognition that newer types of diffusers typically result in diffused juice that has lower pH values. To the extent that diffusion technology generates diffusion juice having different pH values using the same diffusion technology or different diffusion technology, or that improvements to diffusion technology have altered or reduced the pH value of diffusion juice, it can be understood that these conventional approaches to extracting juice from plant material teach away from the teaching of the invention.

As can be easily understood from the foregoing, the basic concepts of the present invention may be embodied in a variety of ways. It involves both analysis techniques as well as devices to accomplish the appropriate analysis. In this application, the analysis techniques are disclosed as part of the results shown to be achieved by the various devices described and as steps that are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims herein included.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied for support of the claims of this application. It should be understood that any such language changes and broad claiming is herein accomplished. This full patent application is designed to support a patent covering numerous aspects of the invention both independently and as an overall system.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "injector" should be understood to encompass disclosure of the act of "injecting"—whether explicitly discussed or not—and, conversely, were there effectively disclosure of the act of "injecting", such a disclosure should be understood to encompass disclosure of a "injector" and even a "means for injecting." Such changes and alternative terms are to be understood to be explicitly included in the description.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

| DOCUMENT NO | DATE | NAME | CLASS | SUBCLASS | FILING DATE |
|---|---|---|---|---|---|
| H1206 | Jul. 06, 1993 | Thibodeaux, et al. | 55 | 90 | Jan. 24, 1991 |
| 1,043,102 | Nov. 05, 1912 | Heesemann, et al. | | | Nov. 13, 1911 |
| 1,578,463 | Mar. 30, 1926 | Nicholson, et al. | | | Oct. 06, 1924 |
| 1,598,787 | Sep. 07, 1926 | Shields, et al. | | | Sep. 01, 1922 |
| 1,815,276 | Jul. 21, 1931 | Schwieger, et al. | | | Sep. 06, 1927 |
| 2,164,186 | Jun. 27, 1939 | Brown, et al. | | | May 03, 1937 |
| 2,547,298 | Apr. 03, 1951 | Wiklund | 127 | 50 | Dec. 27, 1943 |
| 2,557,800 | Jun. 19, 1951 | Seaillis, et al. | 127 | 52 | Jul. 30, 1947 |
| 2,697,049 | Dec. 14, 1954 | Breighel-Miiller | 127 | 50 | Jun. 03, 1949 |
| 2,757,582 | Aug. 07, 1956 | Freeman, et al. | 92 | 28 | Apr. 27, 1954 |
| 2,774,693 | Dec. 18, 1956 | Breighel-Miiller, et al. | 127 | 50 | Mar. 21, 1951 |
| 2,824,028 | Feb. 18, 1958 | Zenzes | 127 | 50 | Jan. 26, 1954 |
| 2,977,253 | Mar. 28, 1961 | Grandadam, et al. | 127 | 50 | Mar. 12, 1958 |
| 2,985,589 | May 23, 1961 | Broughton, et al. | 210 | 34 | May 22, 1957 |
| 3,007542 | Nov. 07, 1961 | Giampapa, et al. | 183 | 2.5 | Jun. 18, 1957 |
| 3,070,935 | Jan. 01, 1963 | De Leon | 55 | 170 | Aug. 10, 1959 |
| 3,089,789 | May 14, 1963 | Van Note, et al. | 127 | 50 | Mar. 23, 1959 |
| 3,113,044 | Dec. 03, 1963 | Alston | 127 | 48 | Mar. 17, 1961 |
| 3,168,419 | Feb. 02, 1965 | Gale | 127 | 50 | Jul. 24, 1961 |
| 3,201,919 | Aug. 24, 1965 | Long, et al. | 55 | 46 | May 23, 1962 |
| 3,358,425 | Dec. 19, 1967 | Burnham, Sr. | 55 | 193 | Jun. 14/66 |
| 3,618,589 | Mar. 16, 1970 | Tavani | 127 | 46 | Nov. 09, 1971 |
| 3,734,773 | May 22, 1973 | Haley | 127 | 48 | Aug. 02, 1971 |
| 3,785,863 | Jan. 15, 1974 | Devillers, et al. | 127 | 9 | Aug. 23, 1971 |
| 3,977,972 | Aug. 31, 1976 | Bloch, et al. | 210 | 63 R | Apr. 02, 1975 |
| 4,081,288 | Mar. 28, 1978 | Torres | 127 | 48 | Dec. 13, 1976 |
| 4,083,732 | Apr. 11, 1978 | Paley | 127 | 48 | Jan. 11, 1965 |
| 4,123,800 | Oct. 31, 1978 | Mazzei | 366 | 150 | May 18, 1977 |
| 4,140,541 | Feb. 20, 1979 | Popper | 127 | 46 | Mar. 25, 1977 |
| 4,182,633 | Jan. 08, 1980 | Ishikawa, et al. | 127 | 46 | Dec. 19, 1977 |
| 4,196,017 | Apr. 01, 1980 | Melville, et al. | 127 | 41 | Jan. 29, 1979 |
| 4,288,551 | Sep. 08, 1981 | Gudnason, et al. | 435 | 168 | Mar. 10, 1980 |
| 4,312,678 | Jan. 26, 1982 | Landis | 127 | 46.2 | Sep. 03, 1980 |
| 4,331,483 | May 25, 1982 | Mirabel, et al. | 127 | 46.2 | Nov. 18, 1980 |
| 4,332,622 | Jun. 01, 1982 | Hohnerlein, Jr., et al. | 127 | 41 | Aug. 25, 1980 |
| 4,345,947 | Aug. 24, 1982 | Rundell, et al. | 127 | 48 | Apr. 28, 1981 |
| 4,352,680 | Oct. 05, 1982 | Hackler | 55 | 48 | Jul. 19, 1979 |
| 4,382,823 | May 10, 1983 | Gudnason | 127 | 57 | Sep. 24, 1981 |
| 4,412,866 | Nov. 01, 1983 | Schoenrock, et al. | 127 | 46.2 | May 26, 1981 |
| 4,421,568 | Dec. 20, 1983 | Huibers | 127 | 48 | Aug. 26, 1981 |
| 4,432,806 | Feb. 21, 1984 | Madsen, et al. | 127 | 48 | Jan. 08, 1982 |
| 4,478,645 | Oct. 23, 1984 | Gudnason | 127 | 57 | Apr. 21, 1983 |
| 4,492,601 | Jan. 08, 1985 | Nakasone, et al. | 127 | 48 | Oct. 15, 1982 |
| 4,534,774 | Aug. 13, 1985 | Leccofre, et al. | 55 | 44 | Aug. 24, 1984 |
| 4,534,800 | Aug. 13, 1985 | Winstrom-Olsen | 127 | 12 | Nov. 23, 1983 |
| 4,785,794 | Nov. 22, 1988 | Jo, et al. | 127 | 46.1 | Jan. 20, 1987 |
| 4,795,494 | Jan. 03, 1989 | Toth, et al. | 127 | 48 | Mar. 14, 1988 |
| 5,102,553 | Apr. 07, 1992 | Kearney, et al. | 210 | 659 | Apr. 01, 1991 |
| 5,110,363 | May 05, 1992 | Clarke, et al. | 127 | 46.1 | Jan. 17, 1991 |
| 5,122,166 | Jun. 16, 1992 | Hyrcyk, et al. | 55 | 38 | Jul. 10, 1990 |
| 5,190,665 | Mar. 02, 1993 | Titmas, et al. | 210 | 743 | Aug. 12, 1991 |
| 5,202,032 | Apr. 13, 1993 | Shoemaker | 210 | 718 | Apr. 22, 1991 |
| 5,262,328 | Nov. 16, 1993 | Clarke, et al. | 436 | 17 | Jan. 02, 1992 |
| 5,314,613 | May 24, 1994 | Russo | 208 | 184 | Sep. 25, 1990 |
| 5,320,681 | Jun. 14, 1994 | Moc, et al. | 127 | 46.1 | Mar. 05, 1992 |
| 5,338,341 | Aug. 16, 1994 | Mazzei, et al. | 96 | 208 | Jun. 04, 1993 |
| 5,352,276 | Oct. 04, 1994 | Rentschler, et al. | 95 | 246 | Feb. 26, 1992 |
| 5,403,475 | Apr. 04, 1995 | Allen | 210 | 168 | Jan. 22, 1993 |
| 5,480,490 | Jan. 02, 1996 | Toth, et al. | 127 | 42 | Feb. 10, 1995 |
| 5,504,196 | Apr. 02, 1996 | Clarke Garegg, et al. | 536 | 17.2 | Sep. 08, 1993 |
| 5,614,086 | Mar. 25, 1997 | Hill, et al. | 210 | 170 | Jun. 05, 1995 |
| 5,674,312 | Oct. 07, 1997 | Mazzei | 95 | 261 | Mar. 26, 1996 |
| 5,759,283 | Jun. 02, 1998 | Ekern, et al. | 127 | 42 | May 14, 1996 |
| 5,846,333 | Dec. 08, 1998 | Partida, et al. | 127 | 37 | Mar. 12, 1996 |

| DOCUMENT NO | DATE | NAME | CLASS | SUBCLASS | FILING DATE |
|---|---|---|---|---|---|
| 5,865,899 | Feb. 02, 1999 | Theoleyre, et al. | 127 | 42 | May 29, 1996 |
| 5,928,429 | Jul. 27, 1999 | Duncan, et al. | 127 | 48 | Oct. 31, 1997 |
| 5,932,016 | Aug. 03, 1999 | Paananen, et al. | 127 | 48 | Nov. 14, 1994 |
| 6,051,075 | Apr. 18, 2000 | Kochergin, et al. | 127 | 42 | Nov. 15, 1996 |
| 6,123,750 | Sep. 26, 2000 | Espinal | 95 | 245 | Oct. 30, 1998 |
| 6,174,378 B1 | Jan. 16, 2001 | Donovan, et al. | 127 | 55 | Aug. 19, 1999 |
| 6,193,893 B1 | Feb. 27, 2001 | Mazzei, et al. | 210 | 702 | Sep. 23, 1999 |
| 6,277,175 | Aug. 21, 2001 | Halder, et al. | 95 | 246 | Apr. 27, 1999 |

James C. P. Chen and Chung ChiChou, "Cane Sugar Handbook: A Manual for Cane Sugar Manufactures and Their Chemists", 12th Edition (1993)
McGinnis, R. A, "Beet Sugar Technology", Third Edition (1982)
van der Poel, et al., "Sugar Technology, Beet and Cane Sugar Manufacture" (1998)

Thus, the applicant(s) should be understood to claim at least: i) each of the juice process systems as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed, xi) processes performed with the aid of or on a computer as described throughout the above discussion, xii) a programmable apparatus as described throughout the above discussion, xiii) a computer readable memory encoded with data to direct a computer comprising means or elements which function as described throughout the above discussion, xiv) a computer configured as herein disclosed and described, xv) individual or combined subroutines and programs as herein disclosed and described, xvi) the related methods disclosed and described, xvii) similar, equivalent, and even implicit variations of each of these systems and methods, xviii) those alternative designs which accomplish each of the functions shown as are disclosed and described, xix) those alternative designs and methods which accomplish each of the functions shown as are implicit to accomplish that which is disclosed and described, xx) each feature, component, and step shown as separate and independent inventions, xxi) the various combinations and permutations of each of the above, and xxii) each potentially dependent claim or concept as a dependency on each and every one of the independent claims or concepts presented.

It should be understood that for practical reasons and so as to avoid adding potentially hundreds of claims, the applicant may eventually present claims with initial dependencies only. Support should be understood to exist to the degree required under new matter laws—including but not limited to European Patent Convention Article 123(2) and United States Patent Law 35 U.S.C §132 or other such laws—to permit the addition of any of the various dependencies or other elements presented under one independent claim or concept as dependencies or elements under any other independent claim or concept.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

I claim:

1. A method of purifying juice obtained from plant material, comprising the steps of:
   a. obtaining plant material;
   b. removing juice from said plant material to obtain a process liquid, wherein said process liquid contains sucrose, non-sucrose substances, and water, and wherein a portion of said non-sucrose substances comprise dissolved material;
   c. heating said process liquid to a temperature between about 55.degree. C. to about 80.degree. C.;
   d. introducing a mixture of gases into said process liquid;
   e. establishing a process liquid-gas interface area between said process liquid and said mixture of gases; and
   f. reducing concentration of said dissolved material within said process liquid to less than the initial concentration of said dissolved material in said process liquid.

2. A method of purifying juice obtained from plant material as described in claim 1, further comprising the steps of:
   a. spreading said process liquid over the surface area of a container; and
   b. venting the interior of said container to atmosphere.

3. A method of purifying juice obtained from plant material as described in claim 2, wherein said step of spreading said process liquid over the surface area of a container comprises applying centrifugal forces to said process liquid.

4. A method of purifying juice obtained from plant material as described in claim 2, wherein said step of applying centrifugal forces to said process liquid comprises centrifugal forces greater than three limes gravity.

5. A method of purifying juice obtained from plant material as described in claim 4, further comprising the steps of: a. dispersing said process liquid to increase said process liquid-gas interface; and b. flowing a mixture of gases through dispersed process liquid.

6. A method of purifying juice obtained from plant material as described in claim 5, further comprising the steps of: a. dispersing said process liquid to increase said process liquid-gas interface; and b. reducing partial pressure of gases at said liquid-gas interface.

7. A method of purifying juice obtained from plant material as described in claim 6, wherein said step of reducing partial pressure of gases at said liquid-gas interface comprises generating partial pressures of gases below atmospheric pressure.

* * * * *